(12) United States Patent  
Barfoot et al.

(10) Patent No.: US 7,756,615 B2  
(45) Date of Patent: Jul. 13, 2010

(54) TRAFFIC MANAGEMENT SYSTEM FOR A PASSAGEWAY ENVIRONMENT

(75) Inventors: Timothy D. Barfoot, Toronto (CA); Joshua A. Marshall, Bolton (CA)

(73) Assignee: MacDonald, Dettwiler & Associates Inc., Brampton, Ontario (CA)

( * ) Notice: Subject to any disclaimer, the term of this patent is extended or adjusted under 35 U.S.C. 154(b) by 877 days.

(21) Appl. No.: 11/493,027

(22) Filed: Jul. 26, 2006

(65) Prior Publication Data

US 2007/0027612 A1 Feb. 1, 2007

Related U.S. Application Data

(60) Provisional application No. 60/702,285, filed on Jul. 26, 2005.

(51) Int. Cl.
  *G08G 1/127* (2006.01)
  *G01C 23/00* (2006.01)
  *G01C 21/26* (2006.01)

(52) U.S. Cl. .......................... 701/25; 701/117; 180/168

(58) Field of Classification Search ........................ None
  See application file for complete search history.

(56) References Cited

U.S. PATENT DOCUMENTS

| | | | |
|---|---|---|---|
| 5,646,844 A | 7/1997 | Gudat et al. | |
| 5,999,865 A | 12/1999 | Bloomquist et al. | ........... 701/25 |
| 6,044,312 A | 3/2000 | Sudo et al. | |
| 6,246,932 B1 | 6/2001 | Kageyama et al. | |
| 6,314,341 B1 | 11/2001 | Kanayama | |

(Continued)

FOREIGN PATENT DOCUMENTS

WO WO 2004/086161 10/2004

OTHER PUBLICATIONS

International Search Report corresponding to PCT/CA2006/001262, 4 pages, date mailed Dec. 7, 2006.

*Primary Examiner*—Michael J. Zanelli  
(74) *Attorney, Agent, or Firm*—Lynn C. Schumacher; Hill & Schumacher

(57) ABSTRACT

The present invention provides a system for coordinating multiple vehicles in a passageway environment (e.g., in underground mines). The system includes methods and apparatus for determining the global position and orientation of a vehicle in said passageway environment, and methods for planning routes and monitoring the travels of multiple vehicles in said passageway environment. A global position and orientation estimation system employs one or more odometric sensors and one or more range sensing devices. It works in three basic steps. In the first step, it records and processes sensor data that is descriptive of the passageway environment by moving the system through said passageway environment. In the second step, it generates a globally consistent map of said passageway environment. Finally, real-time localization is provided by employing odometric sensors and range sensing devices to determine the system's global position and orientation with respect to said globally consistent map, both initially and as it travels through the passageway environment. A route planning method accepts higher-level goals for a set of multiple vehicles in said passageway environment and generates a route plan for each vehicle that minimizes the travel time for the group of vehicles, while at the same time avoiding collisions between vehicles. Route plans are sent to the vehicles for implementation and a monitoring method tracks the global positions and orientations of the vehicles and ensures that both safety and efficiency are maintained.

127 Claims, 9 Drawing Sheets

U.S. PATENT DOCUMENTS

| | | | |
|---|---|---|---|
| 6,349,249 B1 | 2/2002 | Cunningham | 701/28 |
| 6,454,036 B1 * | 9/2002 | Airey et al. | 180/167 |
| 6,459,955 B1 | 10/2002 | Bartsch et al. | |
| 6,459,966 B2 * | 10/2002 | Nakano et al. | 701/23 |
| 6,484,078 B1 | 11/2002 | Kageyama | |
| 6,608,913 B1 | 8/2003 | Hinton et al. | 382/104 |
| 6,633,800 B1 | 10/2003 | Ward et al. | |
| 6,799,100 B2 | 9/2004 | Burns et al. | 701/25 |
| 6,898,503 B2 | 5/2005 | Makela et al. | 701/50 |

* cited by examiner

TRAFFIC MANAGEMENT SYSTEM FOR A PASSAGEWAY ENVIRONMENT

CROSS REFERENCE TO RELATED U.S. PATENT APPLICATION

This patent application relates to U.S. utility patent application Ser. No. 60/702,285 filed on Jul. 26, 2005 entitled GUIDANCE, NAVIGATION, AND CONTROL SYSTEM FOR UNDERGROUND MINING VEHICLES, filed in English, which is incorporated herein in its entirety by reference.

FIELD OF THE INVENTION

The present invention is related to a traffic management system for coordinating multiple vehicles in a passageway environment (for example, for managing the travels of multiple mining vehicles located in an underground mine). The invention includes a system and methods for globally localizing a vehicle in a passageway environment and for planning routes and monitoring the travels of multiple vehicles.

BACKGROUND OF THE INVENTION

Underground mining operations typically utilize several vehicles that work together within complex arrangements of underground passageways. There may be many types of vehicles, such as load-haul-dump (LHD) machines for loading, hauling, and dumping blasted ore or waste material, trucks for subsequently hauling such material longer distances, personnel and service vehicles for transporting people and tools, as well as other mobile equipment (e.g., rock drills and rock-bolting machines). The present invention is related to a system for managing the travels of such vehicles in passageway environments to improve efficiency, productivity, and safety.

During the last decade mining companies and mobile equipment manufacturers have pursued improved efficiency, productivity, and safety by automating some of the functions of underground vehicles. For example, automation systems have been developed for the hauling phase of load-haul-dump operations, and technologies for remotely performing the loading and dumping phases now exist. However, for safety reasons, these automated vehicles are usually operated in underground passageways that are specified as off-limits to manually operated equipment. This restriction is not always optimal from an efficiency and productivity point-of-view, but could be relaxed if a traffic management system were in place to mediate the interaction between automated and manually operated vehicles for improved safety.

In surface mining operations it is typical to have a vehicle dispatching system for assigning tasks and directing individual vehicles so that the production and efficiency of the mining operation are optimized. Such systems can be manual or automated. In the automated case, a computer program attempts to optimize production and efficiency by simultaneously considering several mine parameters, such as the grade distribution, classification, and location of ore and waste rock, the availability of machines, and mill requirements. This dispatching process is enabled by the use of satellite global positioning systems (GPS), whereby the locations of all vehicles in the fleet can be monitored so as to assist dispatch operators or be used as inputs to an automated dispatching system. It is often possible to locate vehicles in a surface mining operation to a resolution of less than ten centimetres. However, dispatching systems (automated systems, in particular) have not been widely applied to underground mining operations. Although there may be several reasons for this, one significant reason is the lack, at present, of real-time global positioning technology for underground passageways.

The common approach to determining the location of vehicles in underground mining operations is through the use of radio frequency identification (RFID) technology. For example, in many cases RFID tags are placed on vehicles and RFID readers are placed at multiple known strategic locations in the mine. When a vehicle equipped with a RFID tag moves through the underground passageways it is presumed that it will pass readers, which will in turn send signals to a central processor indicating where the vehicle has been at brief moments in time. When the vehicle is not near to a reader, no information about its location is provided. For a reader to recognize the presence of a tag, the tag must be within, at best, a few meters of the reader. Obviously, this type of positioning system has several disadvantages, including:

a) it requires that RFID infrastructure be installed throughout the mine and new installations must be done repeatedly as the mine advances;

b) it requires that the locations of installed readers are determined manually and located with respect to a mine map;

c) position information about a vehicle can only be determined when it is near to a reader, and readers can be hundreds of meters apart; and d) direction of travel can only be determined by using multiple RFID readers and precise orientation information is not available.

U.S. Pat. No. 6,349,249 issued to Cunningham discloses an apparatus for tunnel surveying that is also capable of determining its position within a walled environment, such as a mine or building. One of the drawbacks of this system is that it requires a camera and user input to help initially locate itself with respect to a previously known survey point in the walled environment, a process that must be done manually. Moreover, the system only uses an inertial measurement unit (IMU) to determine its position after movement, which can accumulate significant errors after time.

U.S. Pat. No. 6,608,913 issued to Hinton et al. describes a mapping and positioning system for underground mining that uses previously acquired 3D point-cloud data representing the topography of a passageway (obtained using a 3D laser rangefinder) to help determine the position of an object in said passageway. The patent describes a system that utilizes a 3D camera to periodically update an IMU position estimate. Unfortunately, the system as claimed is not suitable for real-time positioning, and thus is unsuitable for real-time traffic management. One reason that it is not real-time is that it requires the conversion of 3D camera data into point cloud data before a reasonably accurate position estimate can be made; this is a time consuming and unnecessary step for the current application.

U.S. Pat. No. 6,898,503 issued to Makela et al. describes a method and apparatus for determining the position of a mining machine that uses odometric wheel rotation sensors to estimate position. To correct for the case when any one of the vehicle's wheels slips with respect to the ground surface, the inventors claim a method for detecting the occurrence of wheel slippage using a variety of sensors, among them a sensor for detecting "the operation of the transmission of the mining machine." When slipping occurs, estimation of the vehicle's position is done solely by comparing wall surface profiles with previously recorded wall surface profiles stored in a memory. One drawback of this method is that it cannot be incorporated into a self-contained system, since it requires that sensing tools be installed on a vehicle. Such sensing tools include a sensor for detecting "the operation of the transmission" and for measuring "the rotation of the wheels" of the vehicle.

International Patent No. 2004/086161 A1 issued to Makela relates to a method for initializing the position and direction of an underground mining vehicle. This would be useful for initializing an underground positioning system, except that this invention can only estimate the initial position from a set of pre-recorded route points. Thus, the system is only useful when used in conjunction with a system that utilizes said route points and is not useful as a stand-alone positioning system.

Another reason automated dispatching systems are uncommon in underground operations is the complexity of the system of passageways. For example, unlike in most surface operations, underground passageways are often too narrow for two vehicles to pass one another, making dispatching algorithms designed for surface operations not directly applicable to underground operations. Once production vehicles have been assigned a task by a dispatching system, one problem is the issue of ensuring that the routes taken by the vehicles are optimal with respect to the time taken by said vehicles. Another problem is the issue of simultaneously ensuring that vehicles do not collide with each other and that their collective routes are planned as such.

U.S. Pat. No. 5,999,865 issued to Bloomquist et al. describes an autonomous vehicle guidance system that includes a traffic management component for managing the routes of automated vehicles in passageway environments. However, their technique, as claimed, is dependant on the disclosed autonomous vehicle guidance system and does not explicitly function with both autonomous and manually driven vehicles, which is a significant disadvantage.

U.S. Pat. No. 6,799,100 issued to Burns et al. describes a system for surface mines that supervises multiple autonomous haul trucks (and possibly manually operated haul trucks) to ensure safety and efficiency. Because the system operates in open-air environments, the satellite global position system (GPS) is used to determine the location of the trucks as a function of time. The described system ensures safety by partitioning the "travel trajectories" for vehicles into zones, to which individual vehicles are subsequently given permission to access in a way that ensures safety, efficiency, and to "produce optimal traffic flow." A comparable traffic management system for passageway environments, such as for an underground mine, does not exist for the technological reasons previously discussed.

Therefore, it would be very advantageous to create a traffic management system for passageway environments that includes a system for accurately estimating in real time the global positions and orientations of multiple vehicles in a passageway environment (whether manually driven, tele-operated, or autonomous) together with a system for managing safe and optimal routes for said vehicles (according to specified tasks for the vehicles) that avoids the aforementioned drawbacks of current technologies and facilitates the development and integration of productivity and efficiency-improving dispatching systems for vehicles in passageway environments.

SUMMARY OF THE INVENTION

The present invention provides a traffic management system for multiple vehicles located in a passageway environment that consists of one or more vehicles equipped with an infrastructureless global position and orientation estimation system that works in real time and a route management system capable of automatically planning and monitoring the routes for the entire fleet of vehicles.

Thus, the present invention provides a traffic management system for one or more vehicles located in a passageway environment comprising:

a) one or more vehicles, each equipped with one or more odometric sensors, one or more range-sensing devices, and a microprocessor including memory storage, said one or more odometric sensors and one or more range-sensing devices being connected to said microprocessor, said microprocessor being programmed to acquire data from said one or more odometric sensors and said one or more range-sensing devices, and based on said data, said microprocessor being programmed for estimating global position and orientation of the vehicle on which it is located in said passageway environment; and b) a central microprocessor that executes said route planning and vehicle monitoring means, said central microprocessor being connected to said one or more vehicles by way of a wireless data communications system, and based on said data, said central microprocessor being programmed for generating strategic route plans for said one or more vehicles located in said passageway environment; and monitoring the global position and orientation of said one or more vehicles in said passageway environment as said one or more vehicles progress along said strategic route plans.

The present invention also provides traffic management method for one or more vehicles located in a passageway environment, the vehicles each being equipped with one or more odometric sensors, one or more range-sensing devices, and a microprocessor including memory storage, said one or more odometric sensors and one or more range-sensing devices being connected to said microprocessor, a central microprocessor being connected to said one or more vehicles by way of a wireless data communications system, and said method comprising the steps of:

a) generating strategic route plans for said one or more vehicles;

b) estimating global positions and orientations of said one or more vehicles in said passageway environment; and c) monitoring the global position and orientation of said one or more vehicles in said passageway environment as said one or more vehicles progress along said strategic route plans.

The present invention also provides a global position and orientation estimation system for passageway environments, which can be made self-contained. Thus, the present invention provides a global position and orientation estimation system for a passageway environment comprising one or more odometric sensors, one or more range-sensing devices, and a microprocessor including memory storage, said one or more odometric sensors and one or more range-sensing devices being connected to said microprocessor; and means for moving the system throughout said passageway environment said microprocessor being programmed for i) simultaneously logging raw data from sensors including scans from said one or more range-sensing devices and said one or more odometric sensors, determining the acquisition times of all raw data, and storing said raw data and acquisition times in said microprocessor memory storage as said system is simultaneously moved throughout said passageway environment ii) pre-processing said logged data to obtain estimates of the system's positions and orientations during the logging process iii) means for storing said logged and pre-processed data to a log file in said microprocessor memory storage iv) means or creating a globally consistent map of said passageway environment from said logged and pre-processed data and storing said globally consistent map in said microprocessor memory storage, and v) means for repeatedly determining the global position and orientation of the system, in real time, as it is propelled through said passageway environment, using said one or more range-sensing devices, said one or more odometric sensors, said microprocessor, and said globally consistent map of said passageway environment stored in said microprocessor memory storage.

The present invention also provides a method for estimating the global position and orientation of a vehicle in a passageway environment, the vehicle being equipped with one or more odometric sensors, one or more range-sensing devices, and a microprocessor including memory storage, said one or more odometric sensors and one or more range-sensing devices being connected to said microprocessor, and said method including the steps of a) estimating the global position and orientation of the vehicle in a passageway environment by the steps of i) moving the vehicle throughout said passageway environment while simultaneously logging raw data from sensors including scans from said one or more range-sensing devices and said one or more odometric sensors, determining the acquisition times of all raw data, and storing said raw data and acquisition times in said microprocessor memory storage ii) pre-processing said logged data to obtain estimates of the vehicle's positions and orientations during the logging process iii) storing said logged and pre-processed data to a log file in said microprocessor memory storage iv) creating a globally consistent map of said passageway environment from said logged and pre-processed data and storing said globally consistent map in said microprocessor memory storage, and v) repeatedly determining the global position and orientation of the vehicle, in real time, as it is propelled through said passageway environment, using said one or more range-sensing devices, said one or more odometric sensors, said microprocessor, and said globally consistent map of said passageway environment stored in said microprocessor memory storage.

During the data logging phase, described above, the present invention may also obtain information relating to radio frequency identification (RFID) infrastructure and communication systems infrastructure (e.g., signal strength to uniquely identifiable wireless network antennas) located in the passageway environment.

In addition to merely logging data, the present invention may include a means to pre-process logged data to obtain estimates of the system's position and orientation during logging by applying dead-reckoning based on the data from one or more odometric sensors, and subsequently improving said position and orientation estimates by comparing readings from range-sensing device(s) to the readings from same range-sensing device(s) that precede them in time.

The step of creation of a globally consistent map of the passageway environment may include creating local maps, which are each only useful in small areas of the passageway environment, and combining these local maps into one or more globally consistent maps. The system also has the ability to combine multiple global maps and store them in a memory, for recall during a subsequent real-time localization phase.

In a preferred embodiment of the invention, the generated local and global maps are metric maps (i.e., maps where the explicit notion of distance between points is defined). In this case, the invention includes a means of matching sub-regions of corresponding local metric maps and aligning said local metric maps with respect to one another in a way that minimizes a desirable cost metric. In one aspect of the invention, said odometric and range-sensing device(s) are used to create a grid-type map representation of the passageway environment, where each cell of the grid is assigned to be either occupied or not occupied.

As mentioned, the system comprises a means for estimating its global position and orientation in real time by employing the aforementioned global map. This is done by first estimating the system's global position and orientation by using a single scan from said range-sensing device(s) and comparing this scan with a finite set of hypotheses, with reference to the created global map. Subsequently, real-time localization of the system is accomplished by applying dead-reckoning based on one or more odometric sensors and by correcting the odometric prediction of position and orientation by comparing data from one or more range-sensing devices to the expected value, given said global map of the passageway environment.

In the preferred embodiment of the invention, the global position and orientation of the system may be represented as a sampled probability density function and a means to compute sample weights, using data acquired in real time, is used to determine the most likely global position and orientation of the system with respect to the global map. If present, the invention allows for information about RFID infrastructure and/or communication systems infrastructure to also be used for helping estimate the system's global position and orientation (e.g., for helping to estimate the initial position and orientation). The system is also capable of determining a level of confidence associated with each position and orientation estimate.

In one aspect of the invention the global position and orientation estimation system, as described above, is portable and multiple vehicles are equipped with such a system. These vehicles could be, for example, mining vehicles in an underground mine. Moreover, in one embodiment, the global position and orientation estimation system may be connected to an interface to allow for user input and for monitoring of the system's output.

The invention's route management system comprises a means for automatically planning safe and efficient routes for multiple vehicles using a global map of the passageway environment and a means for monitoring the real-time global positions and orientations of multiple vehicles for the purpose of detecting deviations from route plans, each equipped with a global position and orientation estimation system as described above.

In one aspect of the invention, a directed graph representation is derived from a global metric map of the passageway environment and is used to help automatically generate optimal route plans based on a search of the graph (e.g., by performing a breadth-first search). In one embodiment, a route plan comprises a sequence of waypoints in the passageway environment and information about specific paths for the vehicle to follow when in the vicinity of said waypoints, all defined with respect to the global metric map.

In one aspect of the invention, high-level goal states for each vehicle (e.g., start, end, and possibly intermediate positions and orientations, possibly for acquiring and/or depositing material or payload) are either supplied by a user or by external supervisory control software (e.g., a dispatching system).

The present invention also provides a means for tracking the global positions and orientation of multiple vehicles in a passageway environment and for comparing the desired global positions and orientations with route plans specified by the route planning method. It also advantageously provides a means for comparing the position and orientation of each vehicle with the positions and orientations of all other vehicles in the passageway environment for determining if a vehicle represents a potential danger to another (e.g., if two vehicles become closer than a safe distance of one another).

A further understanding of the functional and advantageous aspects of the invention can be realized by reference to the following detailed description and accompanying drawings.

BRIEF DESCRIPTION OF THE DRAWINGS

The invention will be more fully understood from the following detailed description thereof taken in connection with the accompanying drawings, which form part of this application, and in which.

DETAILED DESCRIPTION OF THE INVENTION

Figure 1:
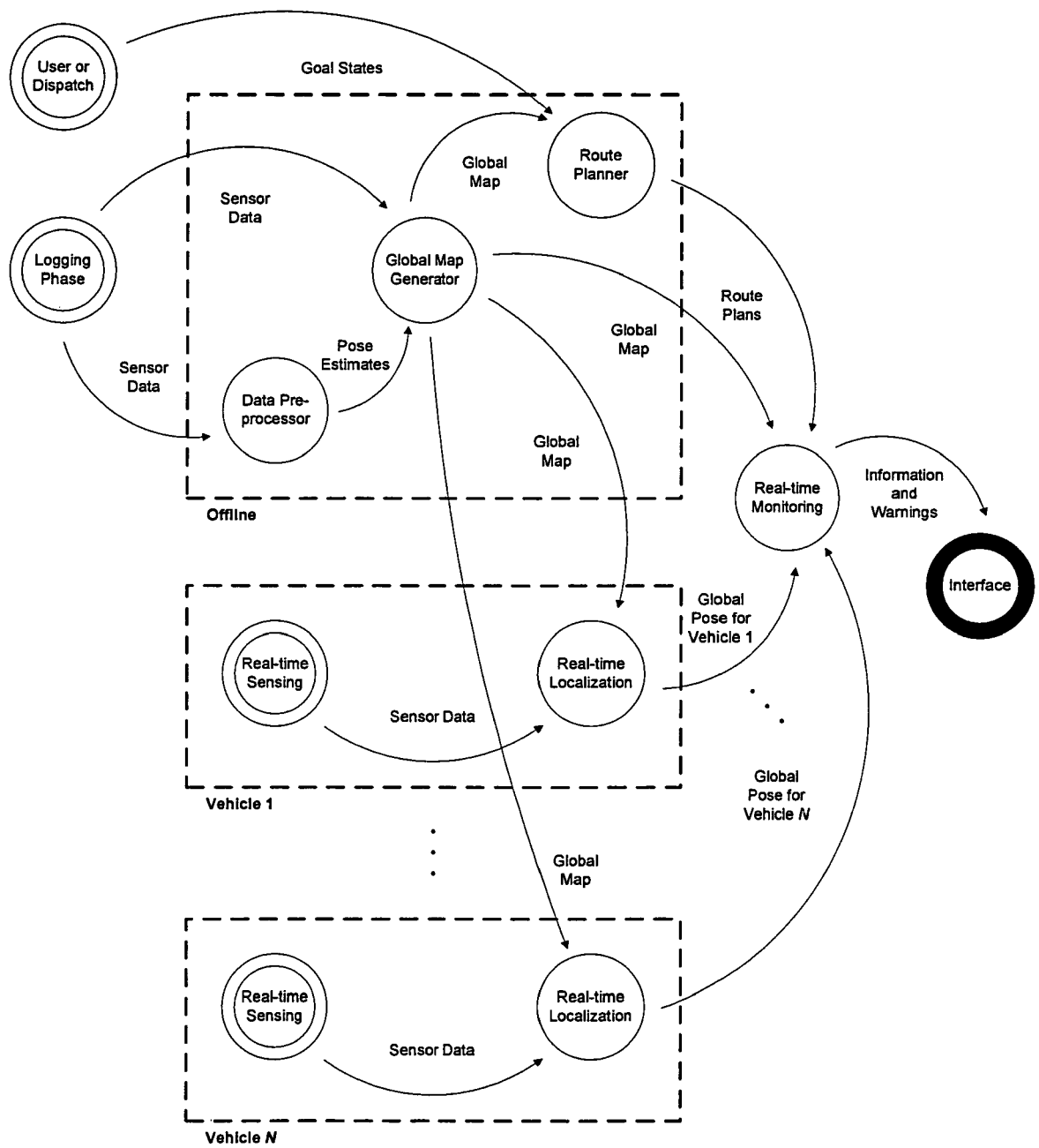
FIG. 1 is a data flow diagram, showing the invention's principal (data processing) elements and how information is passed from one element of the system to another according to the present invention.

As used herein, a "map" refers to a representation of an environment and a "consistent map" refers to a map in which:

a) no two (or more) points on the map represent the same point in the physical environment;

b) no point in the map represents two (or more) points in the physical environment; and c) if the map is a "metric map" (i.e., where the notion of distance between points is defined), then the distance between any two points in the environment is approximately correct (yet scaled) on the map.

As used herein, the phrases "local map" and "local sub-map" both mean a map of a particular region of an environment that is consistent in the region expressed by the map.

As used herein, the phrases "global map" and "globally consistent map" both mean a map of an environment that is consistent in the region expressed by the map, but which may have been created by combining one or more local maps. Thus, a local map is a global map in the region it expresses.

As used herein, the phrase "topological map" means a map in which the notion of distances between points on the map is not defined.

As used herein, the phrase "passageway environment" means any space where vehicles might travel that contains walls, barriers, or obstacles such that said vehicles must travel amongst these objects. Examples of passageway environments include streets among buildings, building hallways, office spaces, underground mines, tunnels, caves, etc. Herein, it is assumed that passageway environments can be represented by maps.

As used herein, the phrase "range-sensing device" means a device for accurately measuring the distance to targets within a certain viewing scope of the device. The distance measurements can be based on any of a number of principles, including time-of-flight, triangulation, phase difference, etc. A "scan" refers to a set of distance data collected from the range-sensing device at a particular instance. The term "rangefinder" is sometimes used as a synonym to "range-sensing device," and a "laser rangefinder" is a range-sensing device that uses lasers and the time-of-flight principle to measure distance.

As used herein, the phrase "position and orientation" refers to an object's coordinates with respect to a fixed point together with its alignment (or bearing) with respect to a fixed axis. For example, the position and orientation of a vehicle in a passageway environment might be the coordinates of a reference point on the vehicle together with the bearing of the vehicle (e.g., in degrees). Sometimes the word "pose" is used as a short form for "position and orientation."

As used herein, the phrases "kinematics model" and "vehicle kinematics" typically refer to a model for the vehicle that considers only the rate of change of the vehicle's configuration. This is in contrast to a "dynamics model" or "vehicle dynamics," which typically consider the forces and resulting accelerations that describe the vehicle's motion. In the same way, the words "kinematics" and "dynamics" are also used to describe the characteristics of different models for individual vehicle components or subsystems, such as actuators.

As used herein, the phrase "inertial measurement unit" means a device that comprises both accelerometers, for measuring acceleration along perpendicular axes, and angular rate sensors (e.g., gyroscopes), for measuring the pitch, roll, and yaw rates of the body to which the sensors are affixed.

As used herein, the phrase "odometric sensor(s)" means a device used to estimate the position and orientation of a vehicle using "dead-reckoning". This dead-reckoned estimate is obtained by incrementally adding to a known initial position and orientation and can be based on data from one or more sensors, including data from an inertial measurement unit, optical encoders, toothed-gear and hall-effect sensor pairs, and a hinge-angle sensor. Moreover, this dead-reckoned estimate can use knowledge about the vehicle's kinematics to fuse data from the one or more odometric sensors. Herein, the word "odometry" is sometimes used as a short form for "estimate of vehicle position and orientation using odometric sensors".

As used herein, the phrase "real time" refers to the characteristic of a process that occurs as part of a larger system. This characteristic is such that the total time for reaction and execution of the process is no more than a maximum allowable delay, in view of the larger system's operations. For example, a system for determining the position of a moving object that is intended to be a "real-time system" must be capable of determining said object's position quickly enough for it to represent a reasonable estimate of the object's instantaneous position, given that said object is moving at a certain rate of travel. In the present invention, a real-time process is generally considered to be one for which reaction and execution of the process occurs at a frequency in a range from about 10 to 100 times per second.

As used herein, an "infrastructureless" position and orientation estimation system refers to a system that does not strictly require the existence of landmarks of any type, which must be pre-installed throughout said passageway environment, in order to properly operate.

As used herein, a "directed graph representation" refers to a topological map comprised of nodes that represent locations in the passageway environment and edges that represent linkages between said locations. The edges are directed, indicating that it is possible to go from one location to another, but only in one direction.

Traffic Management System for Passageway Environments

Figure 4:
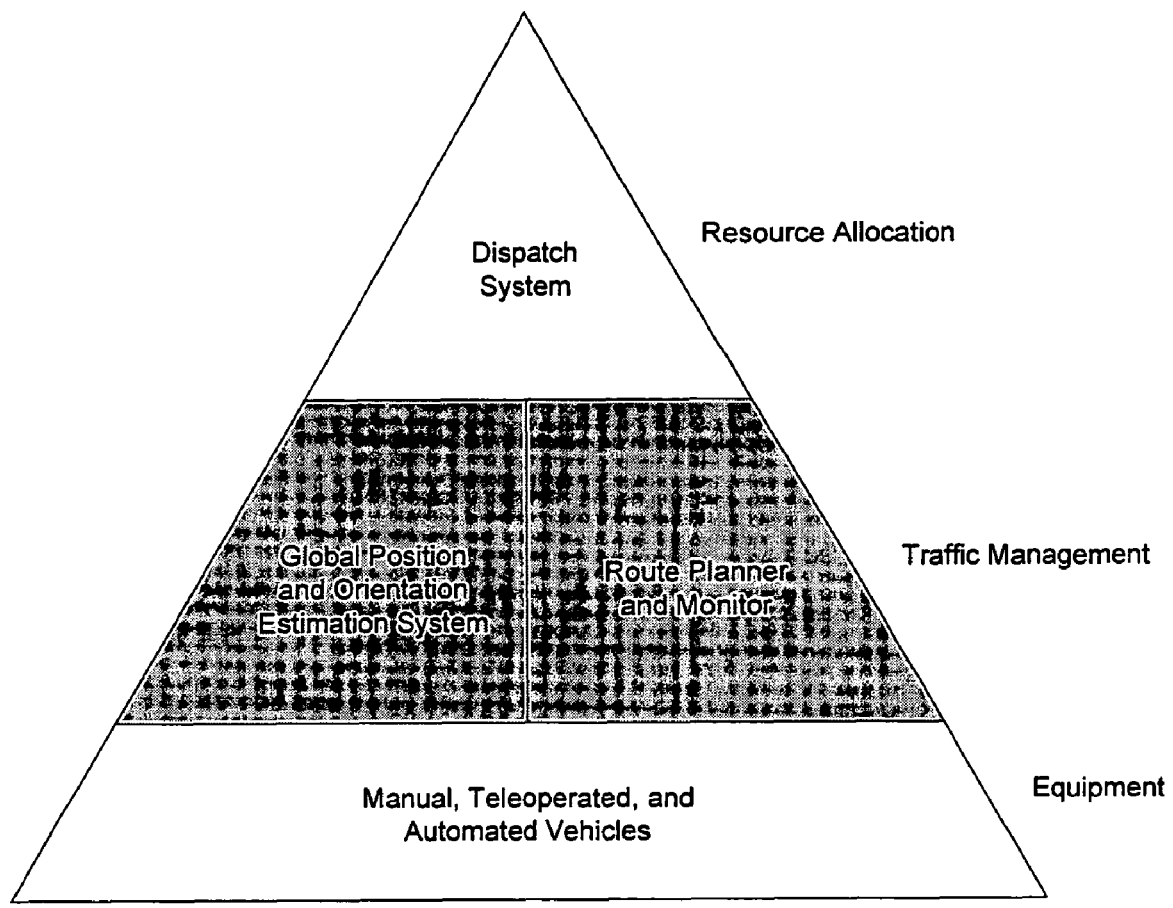
FIG. 4 depicts how the Global Position and Orientation Estimation System as well as the Route Planner and Monitor together form a Traffic Management System and how said traffic management could fit into an overall mine automation system which could additionally involve elements for resource allocation and equipment-level automation.

Referring to FIG. 4, a traffic management system is shown generally as a part of an overall vehicle automation system. In the preferred embodiment, it accepts higher-level decisions from a dispatch system (or other resource allocation method) and translates these decisions into lower-level detailed tasks for individual vehicles to follow. It does so in a way that ameliorates productivity and efficiency while at the same time improving safety. The present invention describes a traffic management system and methods for multiple vehicles located in a passageway environment. Each vehicle is equipped with an infrastructureless global position and orientation estimation system that works in real time. Moreover, the traffic management system comprises a route management system capable of automatically planning and monitoring the routes for an entire fleet of vehicles.

Figure 2:
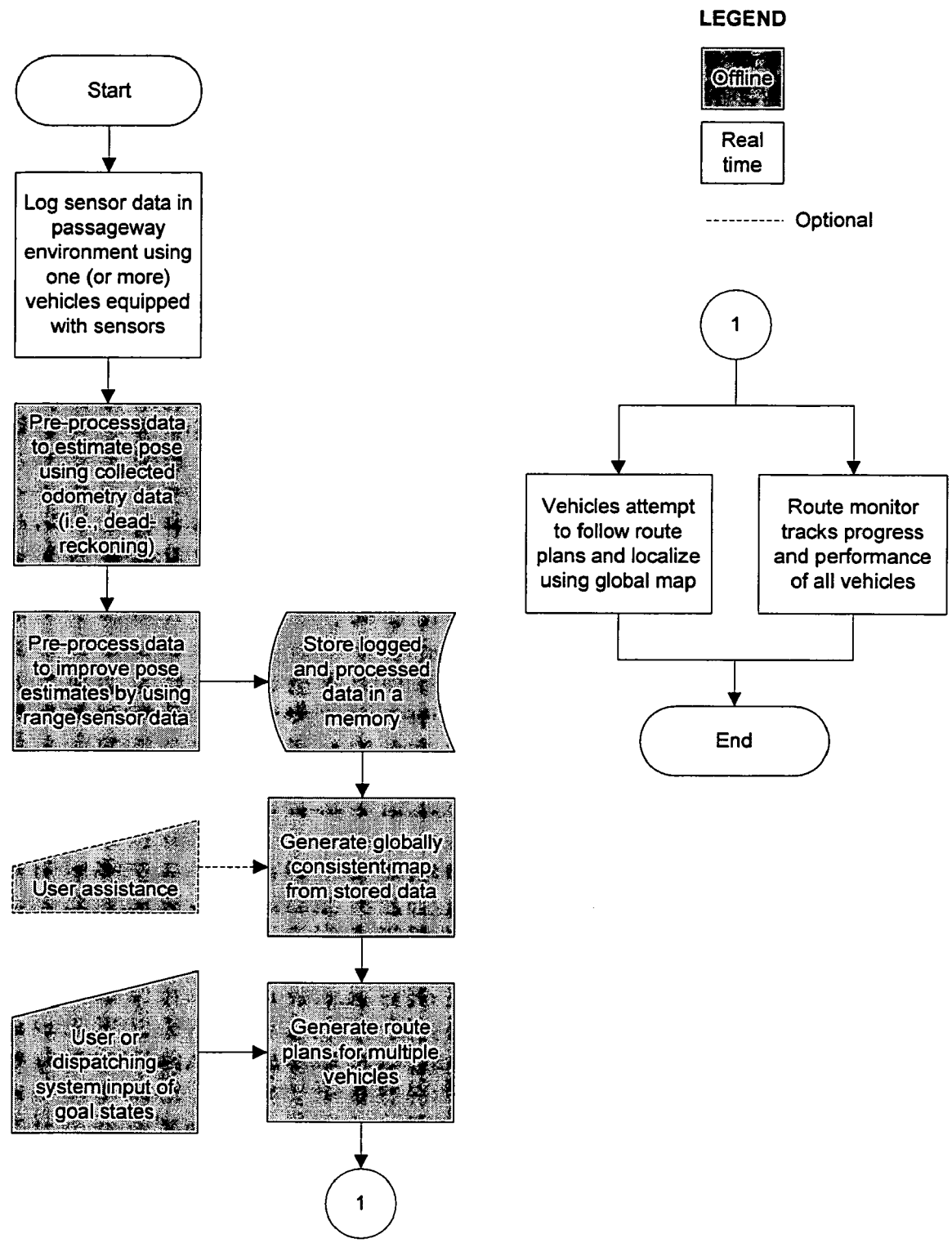
FIG. 2 is a process flow diagram showing the fundamental operational steps of the invention, showing which steps are carried out offline and which steps are carried out in real time.

FIG. 1 is a data flow diagram, showing the principal (data processing) elements of the invention and how information is passed from one element of the system to another according to the present invention. The elements of the overall traffic management system can be broken down into two sub-systems:

a) global position and orientation estimation system, which contains the elements of data logging and pre-processing, global map creation, and global localization b) route management system, which contains the elements of route planning and vehicle monitoring FIG. 2 is a process flow diagram showing the fundamental operational steps of the invention, showing which steps are carried out offline and which steps are carried out in real time.

In what follows, we will first describe the global position and orientation estimation system and its components elements, and then the route management system and its component elements.

Global Position and Orientation Estimation System

Figure 3:
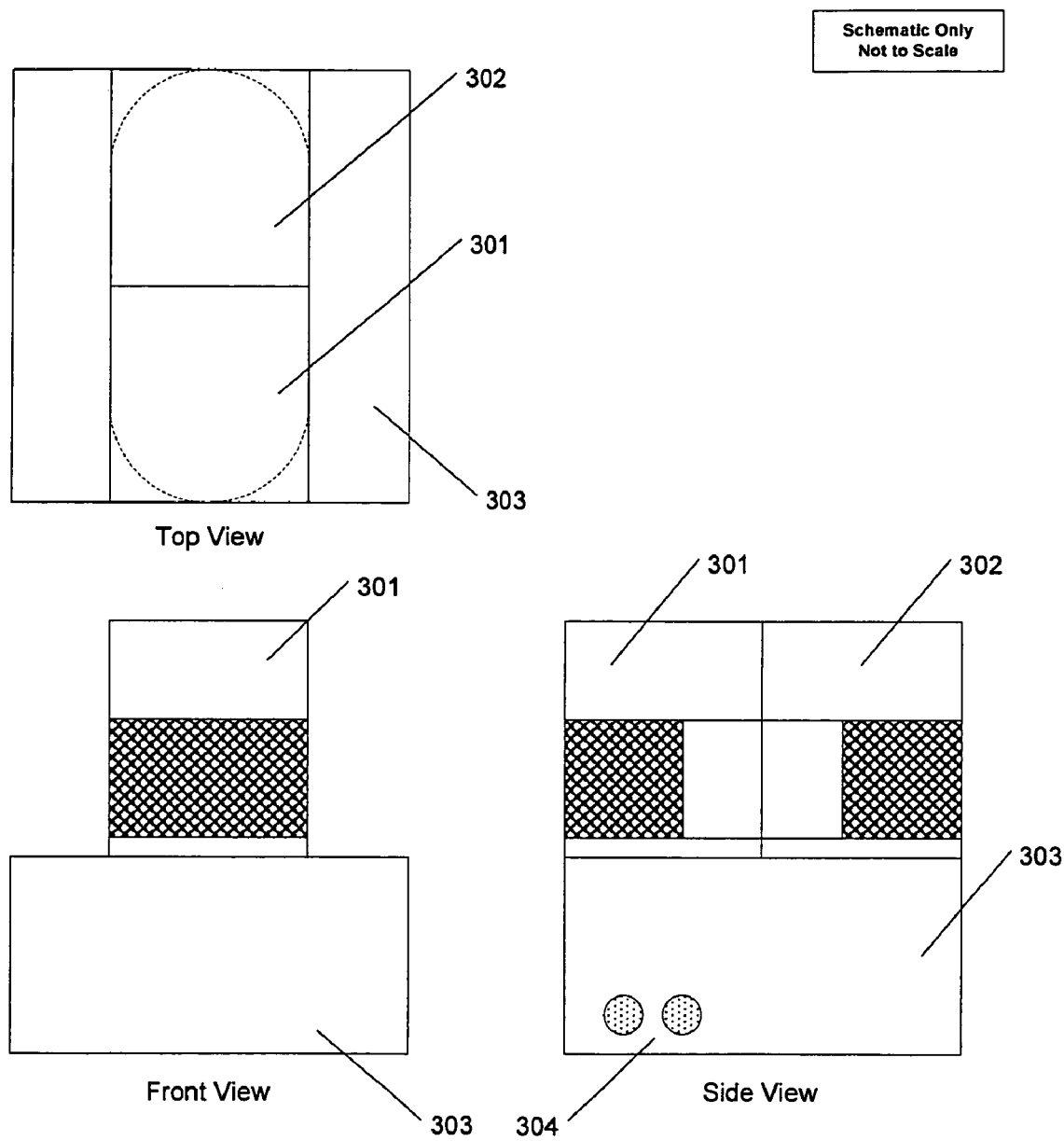
FIG. 3 shows a schematic of one possible embodiment of the described stand-alone embodiment of the global position and orientation estimation system, where there are two range-sensing devices 301, 302 in the form of laser rangefinders and a sealed unit 303 containing a processing unit and an inertial measurement unit (IMU) and possessing data input and output ports 304 for interfacing with external devices such as display and input devices and/or additional sensors.
Figure 6:
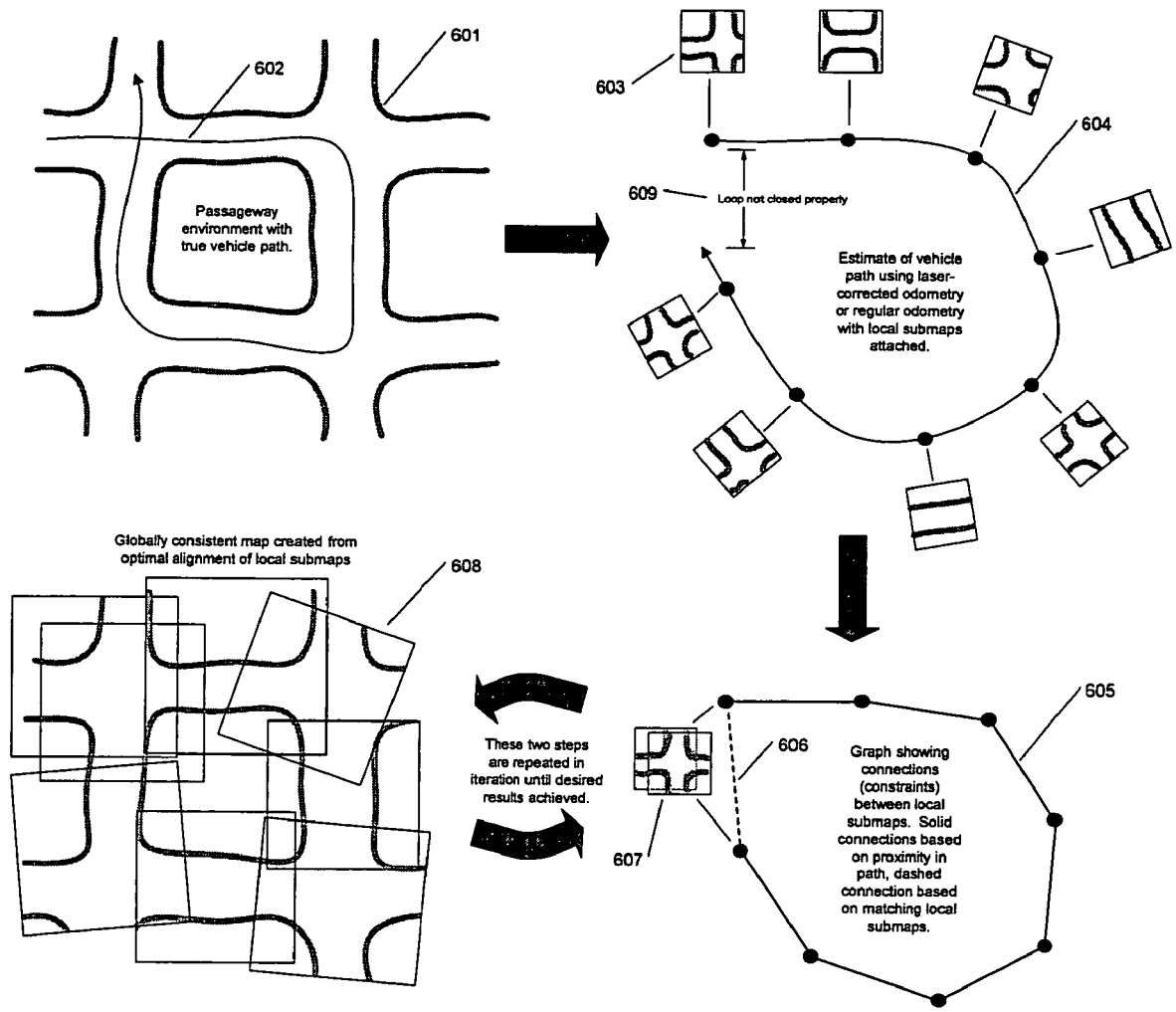
FIG. 6 depicts a method called "global map creation" wherein one or more vehicles travel along a path 602 throughout a passageway environment 601 gathering data. The data is first processed into a sequence of local sub-maps 603 attached along the estimated vehicle path 604. By matching local sub-maps 607 and using an optimization method, a globally consistent map 608 is produced, which properly represents the passageway environment 601.
Figure 7:
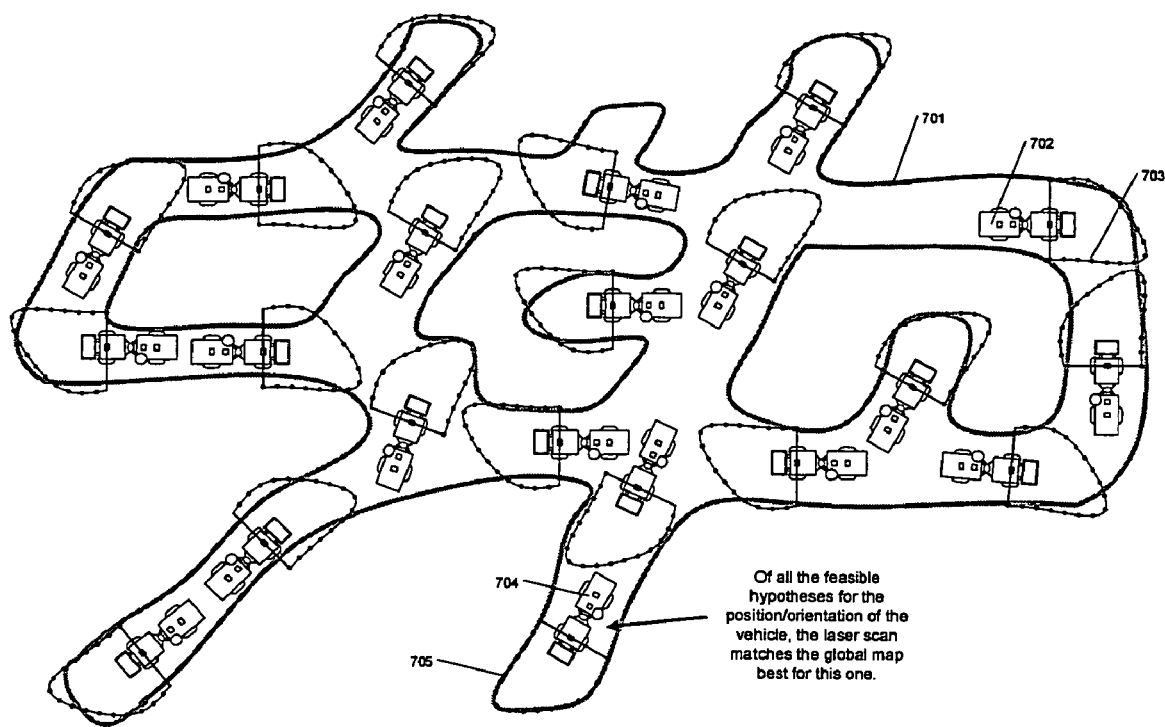
FIG. 7 depicts a method whereby the initial position and orientation of a vehicle in a passageway environment is determined. This is accomplished by first generating a large number of feasible hypotheses for the initial position and orientation of the vehicle 702. For each said hypothesis 702, a rangefinder scan 703 is compared to a globally consistent map 701 of the passageway environment. The hypothesis 704 whose rangefinder scan best matches the map 705 is taken as the initial position and orientation of the vehicle.
Figure 8:
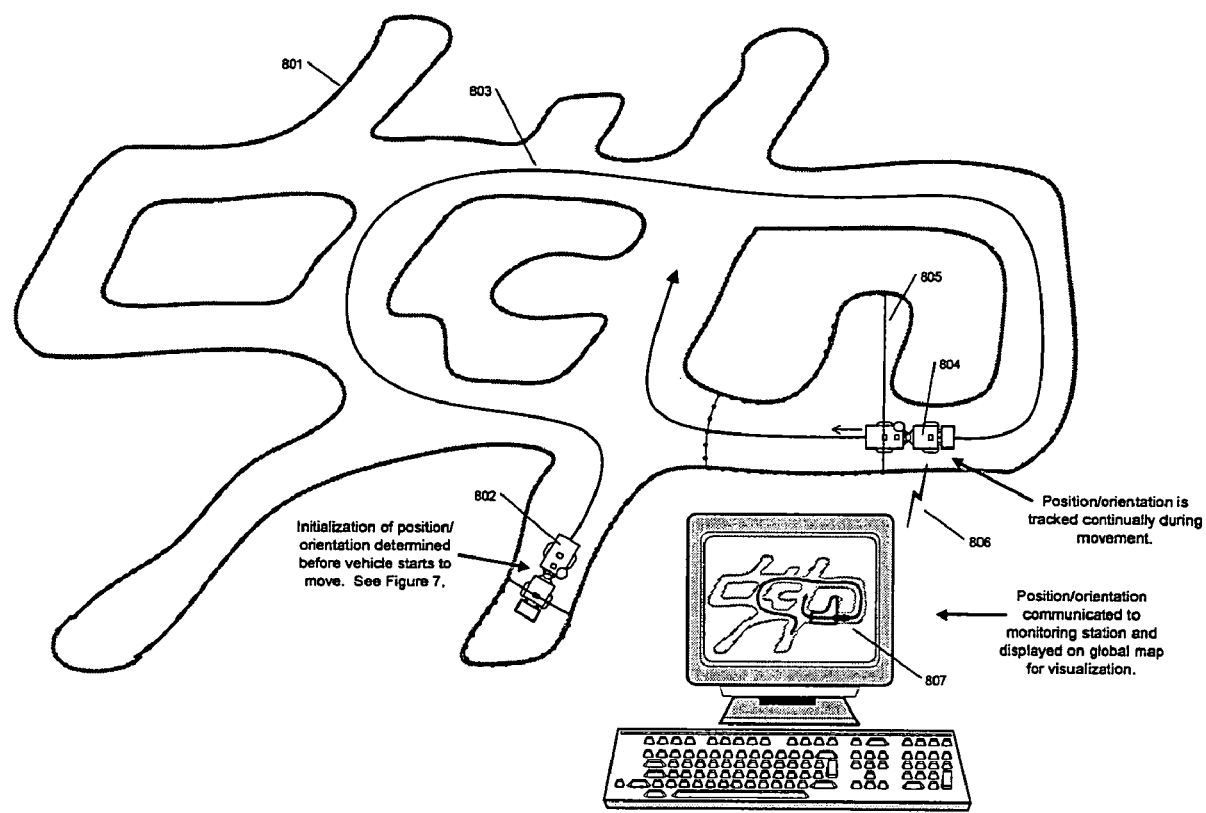
FIG. 8 depicts a global position and orientation estimation method, whereby the initial position and orientation of a vehicle 802 is determined (using the method depicted in FIG. 7) and then the position and orientation 804 is tracked in real time as the vehicle travels along its path 803 by continuing to match rangefinder scans 805 to a globally consistent map of the passageway environment. Optionally, a communication link 806 is used to send said estimates of the vehicle's position and orientation 804 to a remote monitoring station 807 where it is displayed on a rendering of said globally consistent map 801 and vehicle path 803.

The present invention describes an independent system for determining the global position and orientation of said system in a passageway environment, which is possibly self-contained as depicted in the example embodiment of FIG. 3. More particularly, FIG. 3 shows a schematic of one possible embodiment of the described stand-alone embodiment of the global position and orientation estimation system, where there are two range-sensing devices 301, 302 in the form of laser rangefinders and a sealed unit 303 containing a processing unit and an inertial measurement unit (IMU) and possessing data input and output ports 304 for interfacing with external devices such as display and input devices and/or additional sensors;

There are three principal operational steps to the global position and orientation estimation system: data logging and pre-processing (see FIG. 5 for more details), global map creation (see FIG. 6 for more details), and global localization (see FIGS. 7 and 8 for more details).

In the data logging and pre-processing step, sensor data is collected about the passageway environment. Sensor data is combined in the pre-processing step and stored in a format that is suitable for the global map creation step. In this step, a globally consistent map of the passageway environment is generated. In the global localization step, the system employs the logged data and a previously created globally consistent map to determine its global position and orientation in real time. Further details of each of these fundamental operational steps are discussed below.

Data Logging and Pre-Processing

Referring to FIG. 2 again, the purpose of the data logging and pre-processing method is twofold. Its first purpose is to gather raw data about the passageway environment using a variety of sensors. The system includes one or more range-sensing devices (e.g., laser rangefinders) that generate a collection of ranges around a vehicle and computer processing capability to acquire data from said range-sensing devices.

The vehicle includes one or more odometric sensors (e.g., wheel encoders, steering angle sensors, inertial measurement units) and a computer processing means to acquire data from said odometric sensors. In one embodiment, the vehicle also includes a radio receiver and computer processing means to acquire information relating to radio frequency identification (RFID) infrastructure as well a radio transmitter/receiver and computer processing means to acquire information relating to communications system infrastructure (e.g., signal strength to wireless network antennas). The system also includes a means to determine the acquisition times of all the aforementioned data and store them in the computer's memory in a computer log file. In one embodiment, the means of storing said data includes a compression algorithm for efficiently utilizing the available memory on said computer.

Data gathering is physically enabled by moving the system throughout the entire passageway environment or through regions of sole interest. In the preferred embodiment, this is done by securely and advantageously placing the system on a vehicle and driving it through said passageway environment. In one embodiment, the vehicle could be driven manually, wherein an operator sits in the cab of the vehicle and uses the vehicle's manual controls to operate the vehicle (e.g., manutram). In another embodiment, the operator could drive the vehicle remotely either by line-of-sight or tele-operation using cameras mounted on the vehicle. Remote operation requires the use of remote controls, which send commands to the vehicle over a communications system, and which could include the use of a tele-operation station with a screen to display the output of vehicle-mounted cameras and similar controls to those found in the vehicle cab to operate the vehicle. The data logging step should not require the operator to perform any actions in addition to those actions required to normally operate the vehicle from the cab, with the exception of starting the data logging system before commencing the data logging and stopping the data logging process after completing a thorough traverse of the passageway environment.

The second purpose of the data logging and pre-processing method is to combine raw data into estimates of the vehicle's position and orientation associated with each datum sample contained in the stored computer log file. In this step, the recorded odometric sensor data, data from range-sensing devices and associated timestamps are used to compute the vehicle position and orientation at each instant of time in the data logging process using a technique that can be generally described as dead-reckoning. In one embodiment, wherein the system is placed on a centre-articulated vehicle, a hinge angle sensor and wheel odometer may be used to estimate the vehicle's hinge angle rate and translational speeds, respectively. Dead-reckoning can then be accomplished by utilizing the odometer and hinge angle sensors together with a kinematic model that consists of a mathematical relationship (i.e., an ordinary differential equation) that relates the logged hinge angle rate and translational speed to the position and orientation of the vehicle, as expressed in a frame of reference. In another embodiment, the system is equipped with an inertial measurement unit (IMU), which internally employs accelerometers and gyroscopes to measure accelerations and rotational speeds of the system. To determine the position and orientation of the system these accelerations and rotational rates must be integrated (or summed over time).

When using any dead-reckoning approach small errors, for example in the measurements of acceleration and rotational rates, accumulate over time when integrated to determine position and orientation. This is sometimes called a drift in the estimate of position and orientation (as compared with reality). In other words, the true path traversed by the system and the estimated path can conceivably diverge. This drift is problematic, since the purpose is to use these estimates to generate a globally consistent map of the passageway environment.

Figure 5:
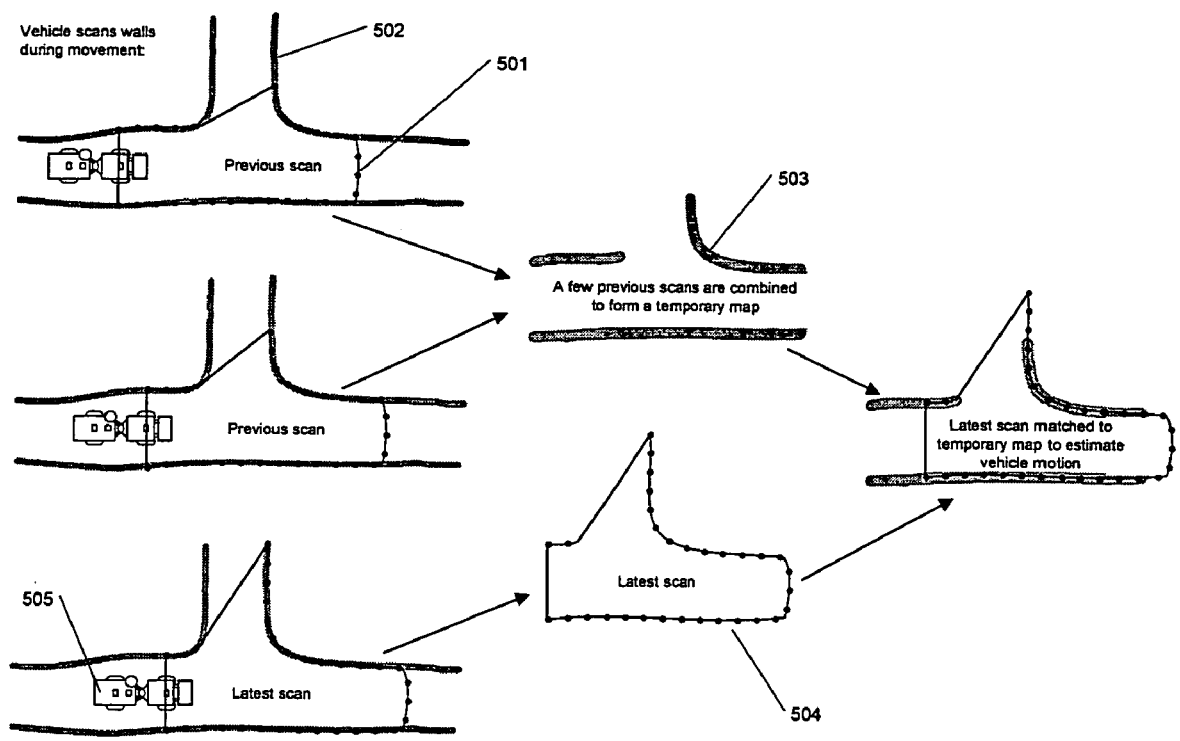
FIG. 5 depicts a method called "scan-matching" wherein consecutive rangefinder scans 501 are used to help correct an estimate of the motion of a vehicle 505 in a passageway environment 502.

Therefore, as is described next, the present invention includes an offline pre-processing step that also serves to improve said estimates of position and orientation (i.e., those based solely on odometric sensors) by additionally employing the logged laser range-sensing device data. In this step, which is depicted in FIG. 5, a technique whereby at each time step the rangefinder scan associated with this time step is compared with one or more rangefinder scans that precede it in time. An improved estimate of the system's position and orientation is obtained by estimating the translation and rotation of the system that induced the change in rangefinder output from one scan to the next. In general this is known as an "incremental simultaneous localization and mapping" approach or "scan-matching" approach. It works by maintaining a map 503 of the environment using a fixed number of rangefinder scans 501 taken in the past. The latest rangefinder scan 504 is aligned with this map 503, thereby providing the pose (i.e., position and orientation) at which the scan was acquired 505. In one embodiment, the employed technique is an iterative closest point (ICP) algorithm, which estimates the aforementioned translation and rotation by using the position and orientation estimate based on odometric sensors as an initial guess, associating points in the previous rangefinder scan with those closest to them in the previous scan (in time), and computing an improved position and orientation estimate by using a mean-square cost function. In another embodiment, a weighted mean-square cost function is applied to compute the improved position and orientation estimate. In the special case when the range-sensing devices are laser rangefinders, the above improvements to position and orientation estimates based solely on odometric sensors are herein collectively referred to as "laser-corrected odometry".

The offline pre-processing steps described above are preferably executed on the system's computer, but could conceivably be executed on another computer by moving the raw data log file to the memory of said other computer.

Following the steps described above, the estimated position and orientation of the system associated with each time step is stored together with the raw logged data in a computer file for later retrieval.

Global Map Creation

As depicted in FIG. 6, the present invention includes a global map creation method to generate a globally consistent map of the passageway environment from one or more data logs. As used herein, a "log" is a file that is stored on a mass storage device that is accessible by the system's microprocessor; the log contains time-stamped sensor readings that were recorded during the above data logging step, as well as position and orientation estimates that were generated during the above data pre-processing step. The collection of these position and orientation estimates are collectively referred to as a "path" 602, which is a sequence of contiguous points that trace out the motion of the system as it traversed the passageway environment during the data logging step described above.

In the present invention, the first step of generating a globally consistent map of said passageway environment is to create a sequence of local maps 603 along the aforementioned path 604. In the preferred embodiment, these local maps are metric maps made of grids of cells, wherein each cell takes on a value of either 'occupied' or 'not occupied'. This type of metric map is sometimes called an "occupancy grid". The resolution of the cells is a designable parameter that can be changed depending on the required accuracy of the map. In one embodiment, the resolution of the cells is at the centimetre scale. It should also be noted that the spacing and size of these local maps is a designable parameter and may be influenced by such factors as the typical size of corridors within the passageway environment and the magnitude of the drift error associated with estimating the position and orientation of the system during the data logging step.

In the preferred embodiment of the invention, the range-sensing devices are laser rangefinders and for each local map said laser rangefinder readings, logged while the system was on the segment of the path that is contained within a specified boundary for said local map, are used to determine the cell values for said local map. This is done through the use of a standard ray-tracing algorithm to mark those cells from the system's position out to the measured rangefinder reading as 'not occupied' and cells a short distance beyond as 'occupied'. A tally is taken of the cell values over all the laser data used for each local map and the final cell value determined by using the most common value for that cell. This approach allows an arbitrarily shaped environment to be represented. Passageways are particularly well represented using this approach. Note that if the path is such that in the true passageway environment it crosses itself (e.g., because of a closed loop or backtracking due to a direction switch) it is possible for two local maps to represent the same region of said passageway environment (for example, when loops are not properly represented 609). However, it may or may not be the case that the local maps actually overlap, since drift error associated with estimating the position and orientation of the system during the data logging step could result in overlap when there should not be overlap and/or non-overlap when there should actually be overlap, depending on the specific situation. The task of solving this problem is part of creating a globally consistent map, which is described below.

The first purpose of creating a globally consistent map is to provide a representation of the passageway environment from which to localize the system. The globally consistent map may also be used for route planning and monitoring, which are discussed elsewhere in the current application. The present method for global map creation includes a means to combine said created local maps into a global map by representing the relationship between local maps as constraints (or connections 605, 606) in a graph. In the preferred embodiment, these constraints comprise a rotation transformation and translation transformation between the local metric maps 603 such that by applying said constraints 605, 606 to said local maps 603 and combining said local maps into a larger map 608, the resulting aggregate map is globally consistent (recall the definition of a consistent map, provided above).

In one embodiment, each constraint also contains statistical information about the constraints to reflect the amount of certainty to which said translational and rotational transformations are known (e.g., mean and covariance associated with said rotation and translation transformations).

In one embodiment, there is a level of confidence associated with each constraint, indicating the estimated quality of the constraint information.

In one embodiment, a user provides input, possibly by way of a graphical user interface, that explicitly specifies the constraints between local maps. This "user assistance" is shown as an input to FIG. 2. User assistance can be required to help make the map globally consistent, particularly if the roadbed conditions are poor and the vehicle has slipped a great deal during data logging. In this case the user can manually indicate which parts of the local metric submaps represent the same part of the physical environment by graphically adding (or removing) the constraints between local metric submaps. For example, the user might indicate that the vehicle has completed a closed loop path by manually linking two local metric submaps with the addition of a constraint.

In the preferred embodiment, and briefly put, said constraints are computed by determining for which local map pairs said constraints should exist (i.e., which local maps should overlap) and then by minimizing an error metric that represents the difference between each local metric map pair and/or for the set of local maps and all existing constraints together, as a whole. A means for determining said constraints (e.g., rotation and translation transformations) is described in further detail below.

The present invention includes a means for determining the constraints between local maps as a way to create a globally consistent map 608 of the passageway environment. This is a two-step process, which involves first determining which local maps overlap and which do not overlap (i.e., determining which local maps possess points that represent common points in the physical passageway environment); and second, estimating the quantitative nature of these constraints (e.g., determining the rotation and translation transformations associated with each constraint).

The first step mentioned above, of determining which local maps overlap and which do not, is sometimes referred to as "data association". Maps that overlap are said to be "associated" or "linked". In the preferred embodiment, local maps that possess common path points are automatically presumed to be associated 605 (i.e., since the local maps were created consecutively from the data, the sequence itself provides an initial estimate of the set of linked maps). However, since a path might cross itself (e.g., a closed loop or backtracking due to a direction switch) it is highly possibly that there will be local map associations not captured by this initial assumption alone. In one embodiment, additional associations 606 are assigned by a procedure of checking for matches between local maps 607 that are sufficiently near to one another (e.g., within a determined threshold distance) for similarity, as measured by an appropriate error metric. If said error in similarity between two maps is below a predetermined threshold, then it would be estimated that the two maps are associated, and an additional constraint 606 is added to the graph to indicate the association. This process of checking similarity can be done iteratively, so as to allow for the correction of false positive associations and false negative associations between local maps.

For the second step, the set of local maps and constraints between them are used to align and combine the local maps into an aggregate global map 608 that is consistent. In the preferred embodiment of the invention, this is done by way of a global optimization routine that minimizes the sum of squared errors over all associated local maps. The outcome of this process determines the best values for the constraints 605, 606 between associated local maps 603 (e.g., it provides the rotation and translation transformations that relate said associated local maps). Once these constraints have been determined, it is straightforward to permanently combine the local maps 603 into a single map 608 that is globally consistent, which is the desired global map 608. In the preferred embodiment, the local maps 603 are occupancy grids, thus the global map 608 is a monolithic occupancy grid that represents the entire passageway environment (as traversed by the system during the data logging step).

The two steps of "data association" and "alignment" can be repeated in iteration until the desired results are achieved. Iterating can be necessary because each time the map is globally aligned, more accurate information is provided by which to decide which local sub-maps truly overlap 607. This iterative process is sometimes called "expectation-maximization (EM)". A convergence criterion may be employed to terminate the iterative process (e.g., when the global error stops improving or drops below a desirable threshold).

In one embodiment of the invention, information about the location of RFID infrastructure is included in the definitions of both the local maps and the created global map. A means for estimating the location of RFID infrastructure is included that uses the strength of RFID signals (from readers) to determine the approximate location of RFID infrastructure from the data captured during the data logging step described above. If the local and global maps are occupancy grids, then this information is associated with specific grid-points in the occupancy grids that represent the location of said RFID infrastructure.

In another embodiment of the invention, information about the location of RFID infrastructure is included in both the local maps and in the created global map. This is done by associating sub-regions of said local and global maps with the ability to sense RFID infrastructure or not, as measured during the data logging step. If the local and global maps are occupancy grids, one way to define said sub-regions is to create a coarser grid representation of said maps and associate the ability to sense RFID infrastructure or not with said coarser grid cells. For example, if at a given point on the path, the system was capable of sensing a particular RFID device, then the ability to sense this particular device is associated with the coarser grid cell that contains said path point.

In one embodiment of the invention, information about the location of communications system infrastructure is included in the definitions of both the local maps and the created global map. A means for estimating the location of communications system infrastructure is included that uses the strength of communications system signals to determine the approximate location of communications system infrastructure from the data captured during the data logging step described above. If the local and global maps are occupancy grids, then this information is associated with specific grid cells in the occupancy grids that represent the location of said communications system infrastructure.

In another embodiment of the invention, information about the location of communications system infrastructure is included in both the local maps and in the created global map. This is done by associating sub-regions of said local and global maps with the ability to sense communications system infrastructure or not, as measured during the data logging step. If the local and global maps are occupancy grids, one way to define said sub-regions is to create a coarser grid representation of said maps and associate the ability to sense communications system infrastructure or not with said coarser grid cells. For example, if at a given path point the system was capable of sensing a particular communications device, then the ability to sense this particular device is associated with the coarser grid cell that contains said path point.

Global Localization

The previous two methods, namely data logging/pre-processing and global map creation, are methods that must be employed before the system is ready to determine its global position and orientation within the passageway environment in real time, in a manner similar to the benefit provided by the satellite GPS system for position determination in open-air environments. In the context of the present invention, this process of determining the system's global position and orientation is termed "localization". As depicted in FIGS. 7 and 8, the present invention describes a global position and orientation estimation method that performs localization in real time. The term "global localization" implies that the system is able to determine its position and orientation in the passageway environment with respect to a global map and without requiring a priori knowledge about the system's initial pose.

Localization is accomplished by first estimating the system's initial position and orientation (see FIG. 7) by using the system's range-sensing device(s) and possibly information about RFID and/or communications system infrastructure, and then tracking movement (see FIG. 8) by subsequently using the system's odometric sensor(s) for dead-reckoning and range-sensing device(s) for correcting said dead-reckoning estimates using the global metric map created by the global map creation method described above.

In the first step, the system's initial position and orientation are estimated before movement by acquiring a single data set from the range-sensing device(s) 703 and by selecting a finite set of feasible hypotheses 702 representing possible initial global positions and orientations for the system. A hypothesis is said to be "feasible" if it is a physically realizable position and orientation for the system. For example, a hypothesis is not feasible if it places the system completely or partially within a wall, obstacle, or other structure contained within said passageway environment.

In one embodiment, these feasible hypotheses are selected in a random manner to reasonably cover the passageway environment.

In another embodiment, the set of feasible hypotheses representing possible initial global positions and orientations are selected by taking into consideration knowledge relating to the location of RFID infrastructure and/or communications system infrastructure in the passageway. This knowledge is obtained by comparing real-time sensor readings with information about the locations of RFID infrastructure and communications system infrastructure contained within a global map and obtained during the data logging step. For example, if a particular RFID device is detected by the system, then hypotheses that are not within the range of said RFID device can be discarded (i.e., can be considered infeasible). A similar example exists and can be described for a communications system device. On the other hand, it is not necessarily true that because the system does not detect the presence of a particular RFID device or communications system device that it is not within the range of said device. It may be, for example, that the signal is weak or that a sensor failure/device failure has occurred. Thus, sensing the presence of a particular device is sufficient but not necessary for the system to reside in a neighbourhood of that device.

Once a set of feasible hypotheses 702 has been chosen, a means of locally optimizing each of said hypotheses is applied by taking into consideration data from the acquired scan 703 from the rangefinder(s). This local optimization can be done by any number of techniques (e.g., by applying a least-squares optimization, weighted least-squares, or other suitable optimization technique). The purpose of the local optimization is to adjust each hypothesis 702 to best match the acquired rangefinder scan 703 (locally). Next, weights are assigned to each hypothesis by comparing data acquired from the rangefinder(s) to the expected value for each hypothesis given the global map 701 created during the global map creation method (see FIG. 6) described above. The expected range is the range one would expect to measure from the hypothesis of the system's position and orientation, using the global metric map 701 and a ray-tracing algorithm to probe along the scan line. The ray-tracing algorithm steps along the scan line outwards from the location of the system's range-sensing device in the scan direction in small increments until an occupied grid cell is found on the global metric map 701. The expected range is the distance from the system's rangefinder sensor to the occupied grid cell. Hence, higher weights are assigned to hypotheses whose expected rangefinder values best match the actual range scan acquired by the range-sensing device(s).

The most likely global initial position and orientation of the system is then estimated by choosing the hypothesis with the highest weight (i.e., the hypothesis 704 that best matches the acquired rangefinder data 705). In one embodiment of the invention, the above described process for estimating the initial global position and orientation of the system is repeated if there is more than one hypothesis with the highest weight and until the weight associated with the best hypothesis exceeds a predetermined and sufficiently high threshold. This iterative process is stopped if the number of iterations exceeds a predetermined number, in which case the system returns an error signal. This iterative process could also be stopped if the highest weight no longer improves from one iteration to the next (i.e., the process has converged).

In one embodiment of the invention, the initial global position and orientation estimate is passed to a user interface and requests confirmation from a user that said estimate is a reasonable estimate. This feature is intended to provide an addition layer of safety in situations where said global position and orientation estimation system is part of a safety-critical system.

Referring to FIG. 8, once the initial position and orientation estimate 802 has been determined, the system is prepared to move through the passageway environment 801 and a dead-reckoned estimate of the vehicle's position and orientation is obtained by using the odometric sensor(s). In one embodiment, wherein the system is placed on a centre-articulated vehicle, a hinge angle sensor and wheel odometer may be used to estimate the vehicle's hinge angle rate and translational speeds, respectively. Dead-reckoning can then be accomplished by utilizing the odometer and hinge angle sensors together with a vehicle kinematics model that consists of a mathematical relationship (e.g., an ordinary differential equation) that relates the logged hinge angle rate and translational speed to the position and orientation of the vehicle, as expressed in a frame of reference. Small errors in the estimation of the hinge angle rate and vehicle speed as well as wheel slip and skidding will introduce a drift in the estimate of vehicle position and orientation as compared to reality. Acting alone, the real position/orientation and the dead-reckoned position and orientation can conceivably diverge due to this drift. For this reason, the predictions of position and orientation made by the dead-reckoning method must be corrected so as to limit the errors (discussed later).

In another embodiment, the system is equipped with an inertial measurement unit (IMU), which internally employs accelerometers and gyroscopes to measure accelerations and rotational rates of the system. To determine the position and orientation of the system these accelerations and rotational rates must be integrated (or summed over time) to compute said position and orientation estimate. When using this dead-reckoning approach, small errors in the measurements of acceleration and rotational rates accumulate over time when integrated to determine position and orientation. This is sometimes called a drift in the estimate of position and orientation (as compared with reality). In other words, the true path traversed by the system and the estimated path can conceivably diverge. For this reason, the predictions of position and orientation made by the dead-reckoning method must be corrected so as to bound the errors (discussed next).

Corrections to the dead-reckoned estimate are made using the global metric map 801 and the sensor readings from the range-sensing device(s) 805. The dead-reckoned estimate serves as an initial guess of the position and orientation of the vehicle with respect to the global map. A correction method starts with this initial guess and refines it so as to ensure the sensor readings from the rangefinder(s) 805 are well-matched to the global metric map 801. There are many techniques available in the published literature by which the alignment of the rangefinder sensor readings 805 to the global metric map 801 may be accomplished. In the preferred embodiment of the invention, a technique that tries to minimize the weighted sum of squared errors is employed. The squared error for an individual rangefinder range measurement is the square of the difference between the measured range and the expected range. The sum of squared errors is this quantity, summed over all the range measurements. A weighted sum of squared errors places more weight on some of the range measurements than others. The expected range is the range one would expect to measure from the dead-reckoned estimate of the vehicle position and orientation, using the global metric map and a ray-tracing algorithm to probe along the scan line. The ray-tracing algorithm steps along the scan line outwards from the vehicle's rangefinder sensor location in the scan direction in small increments until an occupied grid cell is found on the global metric map. The expected range is the distance from the vehicle's rangefinder sensor to the occupied grid cell. In one embodiment, the popular Iterative Closest Point (ICP) algorithm is used to perform the alignment. In another embodiment, a particle filter is used to perform said alignment. In yet another embodiment, a Kalman filter (or variant thereupon) is used to perform said alignment.

In one embodiment of the invention, one or more processors are running software that also comprises an interface to allow for user input and an interface to allow for monitoring of system's estimated global position and orientation. This user interface is connected to the system by way of input and output ports. Said software might comprise a graphical output that shows in real time the estimated global position and orientation of the system on a graphical reproduction of the global metric map 807.

It should be noted that the created global map can be shared among systems operating in the same passageway environment. Thus, in one embodiment there are multiple global position and orientation systems. One of the systems performs data logging/pre-processing and global map creation. This system then shares its global map with the other systems. All systems are then able to globally localize, in real time, from said created global map. Moreover, although range sensing device(s) of relatively good quality (e.g., with good resolution and accuracy) are required for map generation, depending on the nature of the passageway environment range sensing device(s) of poorer quality may be sufficient for real-time localization. This serves to reduce the cost of systems used only for localization and not for data logging/pre-processing and global map creation.

Route Management System

Figure 9:
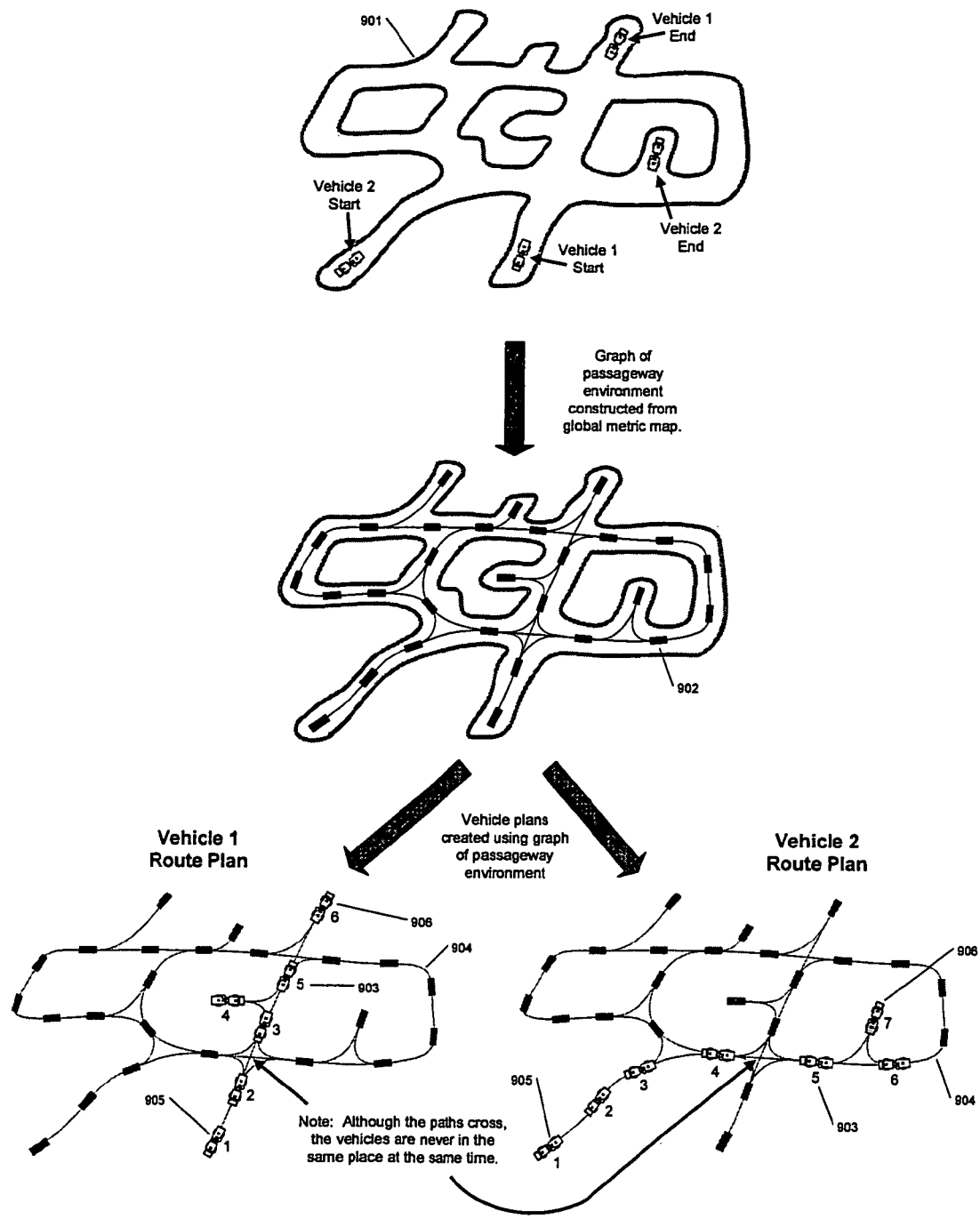
FIG. 9 depicts a route planning method, whereby a globally consistent map 901 is used to plan routes for multiple vehicles. The figure shows an example of this process for two vehicles but the invention is not limited to only two vehicles. The planning is accomplished by first converting the globally consistent map 901 to a graph representation 902 of the passageway environment. Then a planning algorithm is used to generate route plans 904 to take each vehicle from its start configuration 905 to its end configuration 906 in an optimal manner without any resulting collisions. As shown, the plan 904 consists of a numbered sequence of configurations 903, each of which is a node in the graph.

The present invention also comprises a route management system for generating strategic route plans for multiple vehicles in a passageway environment and for monitoring the global positions and orientations of said vehicles in said passageway environment. Referring to FIG. 9, the purpose of said route management method is to complete a generic traffic management interface that serves to facilitate the application of a resource allocation system (e.g., an automated dispatch system) and is required to allow multiple vehicles located in a passageway environment, some of which may be automated and some of which may be manual or tele-operated, to operate in a safe, efficient, and productive manner.

The route management system described in this application comprises two principal methods: a route planning method for generating strategic route plans for one ore more vehicles in a passageway environment (see FIG. 9) that uses a globally consistent map of said passageway environment; and, a vehicle monitoring method that tracks the positions and orientations of all said vehicles for the purposes of supervision and safety (see FIG. 8).

Route Planning

The purpose of the route planning method is to accept inputs from a supervisor that comprise a set of goal states 906 (i.e., high-level instructions) for each vehicle, and to generate a route plan 904 for each vehicle for it to sequentially 903 visit its goal states 906 starting from its initial state 905 in a manner that is safe, efficient, and productive.

In the present invention, a global metric map representation 901 of the passageway environment, preferably obtained from the data logging and pre-processing method described above, is employed to generate a directed graph representation 902 of said passageway environment 901: In the context of the present application and in one embodiment of the invention, said directed graph representation of the passageway environment is a topological map (as opposed to a metric map) in that it captures only the structure of the passageway as defined by "waypoints" in the graph. This directed graph representation 902 can be derived in any number of ways.

In the preferred embodiment of the invention, the directed graph representation 902 of said passageway environment is obtained by generating a sequence of waypoints in the passageway environment. Waypoints are located throughout the passageway environment and are spaced advantageously so as to facilitate the generation of route plans that cover all possible desirable goal states. For example, waypoints could be located along the centre of distinct passageways or at strategic locations derived from the data logging step described above. Some examples are provided below.

In one embodiment of the invention, each of said waypoints is associated with a local sub-map of the passageway environment (which is centred at the given waypoint) together with a local path contained within said local sub-map, information to help steer a vehicle along the path (e.g., if the vehicles are centre-articulated, the waypoint might include information about desirable steering angles along the local path), and information to help specify the speed of a vehicle along the path (e.g., speed limits in certain areas and/or desirable driving speeds around corners, etc.). Associated with said set of waypoints is also a set of constraints that specify which waypoints are linked and how the local maps corresponding to linked waypoints are related (i.e., specifying the constraints between associated local sub-maps). This is accomplished in a similar manner to the technique by which local maps were combined using constraints to generate the globally consistent map of said passageway environment (as described in the global map creation method above).

In another embodiment of the invention, waypoints are placed relatively closely together such that paths for individual vehicles can be derived by combining sequences of linked waypoints. The locations of waypoints could be derived by applying any number of algorithms. In one embodiment, the locations of waypoints could be derived by using the global metric map and a method based on the generation of potential fields, generalized Voronoi diagrams, or the method of "rapidly-expanding random trees". This embodiment does not require the use of local maps, nor local paths. Instead, it requires more sophisticated techniques for choosing the locations of waypoints in the passageway environment so that routes can be traversed by following the sequence of waypoints. The connections between waypoints define feasible paths for the vehicle (i.e., at each point on the path the vehicle's pose is feasible) and include information such as the allowable direction of travel and, if available, desired vehicle speed along the path. In one embodiment, the path is generated by employing a kinematics model of one or more of the vehicles.

In the preferred embodiment of the invention, the aforementioned sequence of goal points comprises desired start 905 and end poses 906 for each vehicle. Moreover, if appropriate, it comprises additional intermediate positions and orientations representing "pause states". For example, if the passageway environment is an underground mine and said vehicles are load-haul-dump machines, the start/end and pause points might represent positions and orientations where the vehicle is requested to load material and/or dump material, as part of its assigned task.

In one embodiment, said goal states are supplied by a user. In another embodiment, the goal states are supplied by external supervisory control software (e.g., a dispatching system). This "user or dispatching system input of goal states" is shown as an input to the method to "generate route plans for multiple vehicles" in FIG. 2. In one embodiment of user input, goal states could be inputted by a user by way of a graphical user interface, whereby the user employs a pointing device to manually select the goal state on a rendering of a globally consistent metric map of the passageway environment. In one embodiment of external input, a computer dispatching program attempts to optimize production and efficiency by simultaneously considering several mine parameters in order to automatically selecting goal points for all the vehicles and communicating said goal points to the route planning method of the current invention.

Given a set of goal states 906 and waypoints, route plans 904 are generated for each vehicle that minimizes the total travel time for the group of vehicles. This optimization can be accomplished by any of a number of methods from the literature on multi-agent systems and robot motion planning. This optimization step is facilitated by the creation of the directed graph representation 902 of said passageway environment 901. The problem is to determine the appropriate sequence of waypoints 903, representing a route plan 904, for each vehicle such that total travel time for the group is minimized. Such a route plan is herein referred to as "optimal". However, it is also important to ensure that route plans 904 are constructed such that safety concerns are alleviated. For instance, the present invention includes a means for ensuring that route plans for multiple vehicles do not result in collisions between the vehicles (assuming that the vehicles follow their prescribed route plans). By utilizing the directed graph representation 902 of said passageway environment 901, an optimal solution can be found by applying a breadth-first search. A breadth-first search ensures that the first solution found will be an optimal one. Other well-known techniques are also applicable, and each one has its own advantages/disadvantages with respect to performance and ease-of-implementation (e.g., other algorithms include depth-first search, Dijkstra's algorithm, A-star, best-first search, and iterative deepening).

Vehicle Monitoring

The purpose of the monitoring method is to track the global position and orientation of all "equipped" vehicles in the passageway environment. Herein, "equipped" vehicles are those that are fitted with a global position and orientation estimation system as described above. In the preferred embodiment, the global map used for real-time localization on each of the equipped vehicles is the same global map 801. The monitoring method provides a means for comparing, in real time, the global position and orientation of each vehicle in the passageway environment to its desired global position and orientation as specified by the aforementioned route planning method. The monitoring method then provides a notification message (e.g., a warning or error) if one or more vehicles deviate too far from their desired global position and orientation as specified by said route planning method.

The aforementioned comparison of each vehicle's actual global position and orientation with its desired position and orientation can be carried out in any number of ways. In the preferred embodiment, the vehicle's position and heading are compared with the desired local path contained in the route plan. The first step is to use the localization method to determine where the vehicle is relative to the path contained in the route profile. This includes estimating the longitudinal distance along the path and the lateral and heading errors with respect to the path. When the vehicle is perfectly on the path and oriented so as to be parallel to the path's tangent, the lateral and heading errors are said to be zero. If the vehicle is slightly to one side of the path or the other, the lateral error is either positive (left) or negative (right). If the vehicle is slightly rotated with respect to the path's tangent the heading error is either positive (anti-clockwise) or negative (clockwise). These two errors (i.e., lateral and heading errors) serve as indicators of how well the vehicle is following its route plan.

In one embodiment of the invention, the vehicle's speed is also monitored to check whether it is exceeding the speed recommended by the route plan, or whether it is travelling too slowly.

The present invention also comprises a means for comparing the global position and orientation of each vehicle with the global positions and orientations of all other vehicles in said passageway environment for the purpose of determining if a vehicle represents a potential danger to another vehicle. For example, a warning or error message is provided if two or more vehicles become closer than a safe distance. In one embodiment, said warning or error message is sent to a central monitoring station as well as to the vehicles in question.

One embodiment of the invention comprises a graphical user interface to allow for user input and for graphically monitoring 807 the positions and orientations of all vehicles in the passageway environment, and for receiving and sending warnings and/or error messages concerning deviations from desired paths and about possible collisions between vehicles.

In the preferred embodiment, the route management system takes advantage of existing communications system infrastructure 806 in said passageway environment as the means by which each equipped vehicle repeatedly communicates its global position and orientation to a centralized computer running software that comprises said vehicle monitoring method.

CONCLUSION

The traffic management system for passageway environments that is described herein includes a system for accurately estimating in real time the global positions and orientations of multiple vehicles in a passageway environment (whether manually driven, tele-operated, or autonomous) together with a system for managing safe and optimal routes for said vehicles (according to specified tasks for the vehicles) that avoids the drawbacks of current technologies and facilitates the development and integration of productivity and efficiency-improving dispatching systems for multiple vehicles in passageway environments. In the preferred embodiment, said passageway environment is an underground mine and said vehicle(s) are underground mining machines (e.g., load-haul-dump machines, haul trucks, or other vehicles).

As used herein, the terms "comprises", "comprising", "including" and "includes" are to be construed as being inclusive and open-ended. Specifically, when used in this document, the terms "comprises", "comprising", "including", "includes" and variations thereof, mean the specified features, steps or components are included in the described invention. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. A traffic management system for one or more vehicles located in a passageway environment comprising:
    a) one or more vehicles, each equipped with one or more odometric sensors, one or more range-sensing devices, and a microprocessor including memory storage, said one or more odometric sensors and one or more range-sensing devices being connected to said microprocessor, said microprocessor being programmed to acquire data from said one or more odometric sensors and said one or more range-sensing devices, and based on said data, said microprocessor being programmed for estimating global position and orientation of the vehicle on which it is located in said passageway environment; and
    b) a central microprocessor that executes said route planning and vehicle monitoring, said central microprocessor being connected to said one or more vehicles by way of a wireless data communications system, and based on said estimated global position and orientation of each of said one or more vehicles, said central microprocessor being programmed for
    generating strategic route plans for said one or more vehicles located in said passageway environment; and
    monitoring the global position and orientation of said one or more vehicles in said passageway environment as said one or more vehicles progress along said strategic route plans.

2. The system according to claim 1 wherein said microprocessor is programmed
    i) for logging raw data from sensors including scans from said one or more range-sensing devices and said one or more odometric sensors as said vehicle moves throughout said passageway environment, determining acquisition times of all raw data, and storing said raw data and acquisition times in said microprocessor memory storage
    ii) pre-processing said logged data to obtain estimates of the vehicle's positions and orientations during the logging process iii) storing said logged and pre-processed data to a log file in said microprocessor memory storage iv) creating a globally consistent map of said passageway environment from said logged and pre-processed data and storing said globally consistent map in said microprocessor memory storage, and v) repeatedly determining the global position and orientation of said vehicle, in real time, as it is propelled through said passageway environment, using said one or more range-sensing devices, said one or more odometric sensors, said microprocessor, and said globally consistent map of said passageway environment stored in said microprocessor memory storage.

3. The system according to claim 2 wherein the vehicle is moved throughout said passageway environment while simultaneously logging data from sensors by an operator manually driving the vehicle through said passageway environment, or configuring said vehicle for tele-operation and remotely driving the vehicle through said passageway environment.

4. The system according to claim 2 wherein said microprocessor is programmed so that during logging of data from sensors information relating to radio frequency identification (RFID) infrastructure is acquired, if present in said passageway environment.

5. The system according to claim 4 wherein creating a globally consistent map of said passageway environment includes estimating the locations of RFID infrastructure, if present in said passageway environment, with respect to said globally consistent map.

6. The system according to claim 2 wherein said microprocessor is programmed so that during logging of data from sensors information relating to communications system infrastructure is acquired, if present in said passageway environment.

7. The system according to claim 6 wherein creating a globally consistent map of said passageway environment includes estimating the locations of communications system infrastructure, if present in said passageway environment, with respect to said globally consistent map.

8. The system according to claim 2 wherein pre-processing said logged data to obtain estimates of the system's positions and orientations during the logging process includes processing said raw data to obtain estimates of the vehicle's positions and orientations during logging by applying dead-reckoning based on raw data from said one or more odometric sensors and by improving said dead-reckoned estimates by comparing each range-sensing device scan to one or more scans that precede it in time.

9. The system according to claim 2 wherein said microprocessor is programmed so that creating a globally consistent map of said passageway environment includes generating a sequence of local maps of the passageway environment from said logged sensor data, said data acquisition times, and said pre-processed data stored in said microprocessor memory storage, combining said local maps of the passageway environment into one or more larger maps that are globally consistent, and storing the local maps and said globally consistent maps of said passageway environment in said microprocessor memory storage.

10. The system according to claim 9 wherein creating a globally consistent map of said passageway environment includes combining multiple globally consistent maps into a larger globally consistent map.

11. The system according to claim 9 wherein combining said local maps into one or more globally consistent maps includes using input provided by a human operator by way of a user interface.

12. The system according to claim 9 wherein said local maps are local metric maps and said one or more globally consistent maps are one or more globally consistent, and wherein combining said local metric maps into one or more globally consistent maps includes determining which local metric maps are associated and which are not, matching subregions of said local metric maps to one another, aligning said local metric maps with respect to one another, and subsequently optimizing the quality of said matching and alignment of all the local metric maps by minimizing a desirable error metric.

13. The system according to claim 9 wherein said local maps and said globally consistent map are metric maps, and wherein generating said local metric maps of said passageway environment includes using logged data from both said one or more odometric sensors and one or more range-sensing devices and wherein said local metric maps include grids of cells, wherein each cell takes on a cell value of either 'occupied' or 'not occupied' such that a cell is assigned to be 'occupied' if it is estimated that the region of said passageway represented by the cell contains an obstacle, and a cell is assigned to be 'not occupied' if the region of said passageway represented by the cell contains free space that is possibly traversable by a self-propelled vehicle.

14. The system according to claim 13 wherein spacing and boundaries of said local metric maps are constructed using knowledge of the sensing range of said one or more range-sensing devices, the maximum size of corridors within said passageway environment, and adrift error associated with dead-reckoning, and such that there is sufficient overlap in the regions expressed by contiguous local metric maps so as to enable combining local metric maps into a globally consistent map of said passageway environment.

15. The system according to claim 13 wherein determining the cell values for said local metric maps is done through the use of a ray-tracing algorithm to mark those cells from the system's position out to the measured range-sensing device reading as 'not occupied' and cells a short distance beyond as 'occupied', then taking a tally of the cell values over all the logged data from said one or more range-sensing devices used for each local map and computing a final cell value by using the most common value for that cell.

16. The system according to claim 2 wherein repeatedly determining the global position and orientation of the vehicle, in real time, as it is moved through said passageway environment includes estimating the initial global position and orientation of the vehicle with respect to said globally consistent map before movement of the vehicle by using said one or more range-sensing devices.

17. The system according to claim 16 wherein said globally consistent map is a globally consistent metric map, and wherein estimating the initial global position and orientation of the vehicle with respect to said globally consistent metric map before movement includes selecting a finite set of feasible hypotheses representing possible initial global positions and orientations for the vehicle, locally optimizing each of said hypotheses by a suitable optimization algorithm, computing weights for each of said hypotheses by comparing data acquired from said one or more range-sensing devices to the expected value for each hypothesis given said globally consistent metric map, and determining the most likely initial global position and orientation of the vehicle from said computed weights associated with said hypotheses.

18. The system according to claim 17 wherein an error signal is reported if the weight associated with said most likely initial global position and orientation system is below some specified threshold.

19. The system according to claim 17 wherein for estimating the initial global position and orientation of the vehicle includes passing said estimate to a user interface connected to said microprocessor that requests confirmation from a user that said estimate is a reasonable estimate.

20. The system according to claim 17 wherein said set of feasible hypotheses are selected by incorporating knowledge about the location of RFID infrastructure, if present in said passageway environment.

21. The system according to claim 17 wherein said set of feasible hypotheses are selected by incorporating knowledge about the location of communications system infrastructure in said passageway environment.

22. The system according to claim 17 wherein repeatedly determining the global position and orientation of the vehicle includes determining a level of confidence associated with said global position and orientation estimate.

23. The system according to claim 16 wherein said globally consistent map is a globally consistent metric map, and wherein-repeatedly determining the global position and orientation of the vehicle includes estimating the vehicle's position and orientation by dead-reckoning as well as using data from said one or more range-sensing devices for correcting said dead-reckoned vehicle position and orientation using said globally consistent metric map.

24. The system according to claim 23 wherein correcting said dead-reckoned vehicle position and orientation using said globally consistent metric map includes minimizing a suitable error between data acquired from said one or more range-sensing devices and the expected range-sensing device data for an appropriately selected set of possible positions and orientations of the vehicle given said globally consistent metric map.

25. The system according to claim 2 wherein said means to estimate each vehicle's global position and orientation in said passageway environment is a self-contained and portable unit that can be advantageously mounted on said vehicle located in a passageway environment.

26. The system according to claim 2 wherein said estimating each vehicle's global position and orientation in said passageway environment includes using an interface connected to said microprocessor that provides a graphical output for displaying the vehicle's global position and orientation, in real time, with respect to said globally consistent map of said passageway environment.

27. The system according to claim 2 wherein said route planning includes generating a directed graph representation of said passageway environment, specifying a sequence of goal states for said one or more vehicles to visit based on said directed graph representation, and generating a route plan for each vehicle to sequentially visit said respective goal states.

28. The system according to claim 27 wherein said route plans for said one or more vehicles together minimize the total travel time for the group of said one or more vehicles, and wherein said route planning includes ensuring that the route plans for said one or more vehicles do not result in collisions between said vehicles if the number of vehicles is greater than one.

29. The system according to claim 28 wherein said route planning that minimizes the total travel time for the group of said one or more vehicles is based on a search of said directed graph representation of said passageway environment.

30. The system according to claim 27 wherein generating said directed graph representation of said passageway environment includes generating a sequence of waypoints that contains information relating to i) a local path in said passageway environment, and ii) a local metric map defined relative to said local path.

31. The system according to claim 30 wherein generating said directed graph representation of said passageway environment includes generating a sequence of constraints that contain information about how said local paths should be stitched together and information about how to combine said local metric maps into one or more globally consistent metric maps.

32. The system according to claim 30 wherein said local paths are constructed from sequences of local path points in said passageway environment, and wherein said local path points include information to help steer a vehicle along the path and information to help specify an appropriate speed for a vehicle travelling along the path.

33. The system according to claim 27 wherein generating said directed graph representation of said passageway environment includes generating a sequence of closely spaced waypoints so that paths traversable by the vehicles can be constructed by forming sequences of said waypoints.

34. The system according to claim 27 wherein said sequence of goal states for said one or more vehicles to visit includes desired start and end positions and orientations for each vehicle and, if appropriate, additional intermediate positions and orientations representing pause states, such as would be needed for a vehicle to acquire or deposit payload.

35. The system according to claim 27 wherein said goal states are either supplied by a user or by external supervisory control software.

36. The system according to claim 2 wherein said central microprocessor is programmed to compare, in real time, the estimated global position and orientation of each vehicle in said passageway environment to its desired position and orientation as specified by said strategic route plan, and providing notification if one or more vehicles deviate too far from their respective desired global positions and orientations as specified by said plan.

37. The system according to claim 2 wherein said central microprocessor is programmed to compare, in real time, the estimated speed of each vehicle to its desired speed as specified by said route plan and providing notification if one or more vehicles deviate too far from their respective desired speeds as specified by said route plan.

38. The system according to claim 2 wherein said central microprocessor is programmed to compare the estimated global position and orientation of each vehicle in said passageway environment with the global positions and orientations of every other vehicle in said passageway environment, determining if one or more vehicles represent a proximity danger to other vehicles, and providing immediate notification to all affected vehicles by way of said wireless data communications system if any vehicle represents a potential danger to any other vehicle.

39. The system according to claim 2 wherein said central microprocessor that executes said route planning and vehicle monitoring includes a graphical user interface to allow for user input and for human monitoring of the global positions and orientations of all vehicles with respect to a globally consistent map of said passageway environment.

40. The system according to claim 1 wherein said central microprocessor is programmed for monitoring the vehicle's speed.

41. A global position and orientation estimation system for a passageway environment comprising
- one or more odometric sensors, one or more range-sensing devices, and a microprocessor including memory storage, said one or more odometric sensors and one or more range-sensing devices being connected to said microprocessor; and
- means for moving the system throughout said passageway environment, said microprocessor being programmed for
  - i) simultaneously logging raw data from sensors including scans from said one or more range-sensing devices and said one or more odometric sensors, determining the acquisition times of all raw data, and storing said raw data and acquisition times in said microprocessor memory storage as said system is simultaneously moved throughout said passageway environment
  - ii) pre-processing said logged data to obtain estimates of the system's positions and orientations during the logging process
  - iii) storing said logged and pre-processed data to a log file in said microprocessor memory storage
  - iv) creating a globally consistent map of said passageway environment from said logged and pre-processed data and storing said globally consistent map in said microprocessor memory storage, and
  - v) repeatedly determining the global position and orientation of the system, in real time, as it is propelled through said passageway environment, using said one or more range-sensing devices, said one or more odometric sensors, said microprocessor, and said globally consistent map of said passageway environment stored in said microprocessor memory storage.

42. The system according to claim 41 wherein said means for moving the system throughout said passageway environment while simultaneously logging data from sensors includes mounting said system on a vehicle and an operator manually driving the vehicle through said passageway environment, or configuring said vehicle for tele-operation and remotely driving the vehicle through said passageway environment.

43. The system according to claim 41 wherein logging data from sensors includes acquiring information relating to radio frequency identification (RFID) infrastructure, if present in said passageway environment.

44. The system according to claim 43 wherein creating a globally consistent map of said passageway environment includes estimating the locations of RFID infrastructure, if present in said passageway environment, with respect to said globally consistent map.

45. The system according to claim 41 wherein logging data from sensors includes acquiring information relating to communications system infrastructure, if present in said passageway environment.

46. The system according to claim 45 wherein creating a globally consistent map of said passageway environment includes estimating the locations of communications system infrastructure, if present in said passageway environment, with respect to said globally consistent map.

47. The system according to claim 41 wherein pre-processing said logged data to obtain estimates of the system's positions and orientations during the logging process includes processing said raw data to obtain estimates of the system's positions and orientations during logging by applying dead-reckoning based on raw data from said one or more odometric sensors and by improving said dead-reckoned estimates by comparing each range-sensing device scan to one or more scans that precede it in time.

48. The system according to claim 41 wherein creating a globally consistent map of said passageway environment includes generating a sequence of local maps of the passageway environment from said logged sensor data, said data acquisition times, and said pre-processed data stored in said microprocessor memory storage, combining said local maps of the passageway environment into one or more larger maps that are globally consistent, and storing the local maps and said globally consistent maps of said passageway environment in said microprocessor memory storage.

49. The system according to claim 48 wherein creating a globally consistent map of said passageway environment includes combining multiple globally consistent maps into a larger globally consistent map.

50. The system according to claim 48 wherein combining said local maps into one or more globally consistent maps includes using input provided by a human operator by way of a user interface.

51. The system according to claim 48 wherein said local maps are local metric maps and said one or more globally consistent maps are one or more globally consistent metric maps, and wherein combining said local metric maps into said one or more globally consistent maps includes determining which local metric maps are associated and which are not, matching sub-regions of said local metric maps to one another, aligning said local metric maps with respect to one another, and subsequently optimizing the quality of said matching and alignment of all the local metric maps by minimizing a desirable error metric.

52. The system according to claim 48 wherein said local maps and said globally consistent map are metric maps, and wherein generating said local metric maps of said passageway environment includes using logged data from both said one or more odometric sensors and one or more range-sensing devices and wherein said local metric maps include grids of cells, wherein each cell takes on a cell value of either 'occupied' or 'not occupied' such that a cell is assigned to be 'occupied' if it is estimated that the region of said passageway represented by the cell contains an obstacle, and a cell is assigned to be 'not occupied' if the region of said passageway represented by the cell contains free space that is possibly traversable by a self-propelled vehicle.

53. The system according to claim 52 wherein spacing and boundaries of said local metric maps are constructed using knowledge of the sensing range of said one or more range-sensing devices, the maximum size of corridors within said passageway environment, and a drift error associated with dead-reckoning, and such that there is sufficient overlap in the regions expressed by contiguous local metric maps so as to enable combining local metric maps into a globally consistent map of said passageway environment.

54. The system according to claim 52 wherein determining the cell values for said local metric maps is done through the use of a ray-tracing algorithm to mark those cells from the system's position out to the measured range-sensing device reading as 'not occupied' and cells a short distance beyond as 'occupied', then taking a tally of the cell values over all the logged data from said one or more range-sensing devices used for each local map and computing a final cell value by using the most common value for that cell.

55. The system according to claim 41 wherein repeatedly determining the global position and orientation of the system, in real time, as it is moved through said passageway environment includes estimating the initial global position and orientation of the system with respect to said globally consistent map before movement of the system by using said one or more range-sensing devices.

56. The system according to claim 55 wherein said globally consistent map is a globally consistent metric map, and wherein estimating the initial global position and orientation of the system with respect to said globally consistent metric map before movement includes selecting a finite set of feasible hypotheses representing possible initial global positions and orientations for the system, locally optimizing each of said hypotheses by a suitable optimization algorithm, computing weights for each of said hypotheses by comparing data acquired from said one or more range-sensing devices to the expected value for each hypothesis given said globally consistent map, and determining the most likely initial global position and orientation of the system from said computed weights associated with said hypotheses.

57. The system according to claim 56 wherein an error signal is reported if the weight associated with said most likely initial global position and orientation system is below some specified threshold.

58. The system according to claim 56 wherein estimating the initial global position and orientation of the system includes passing said estimate to a user interface connected to said microprocessor that requests confirmation from a user that said estimate is a reasonable estimate.

59. The system according to claim 56 wherein said set of feasible hypotheses are selected by incorporating knowledge about the location of RFID infrastructure in said passageway environment.

60. The system according to claim 56 wherein said set of feasible hypotheses are selected by incorporating knowledge about the location of communications system infrastructure in said passageway environment.

61. The system according to claim 56 wherein repeatedly determining the global position and orientation of the system includes determining a level of confidence associated with said global position and orientation estimate.

62. The system according to claim 55 wherein said globally consistent map is a globally consistent metric map, and wherein repeatedly determining the global position and orientation of the system includes estimating the system's position and orientation by dead-reckoning as well using data from said one or more range-sensing devices for correcting said dead-reckoned system position and orientation using said globally consistent metric map.

63. The system according to claim 62 wherein correcting said dead-reckoned vehicle position and orientation using said globally consistent metric map includes minimizing a suitable error between data acquired from said one or more range-sensing devices and the expected range-sensing device data for an appropriately selected set of possible positions and orientations of the system given said globally consistent metric map.

64. The system according to claim 41 wherein said global position and orientation estimation system is a self-contained and portable unit that can be advantageously mounted on a vehicle located in a passageway environment.

65. The system according to claim 41 wherein said global position and orientation estimation system includes an interface connected to said microprocessor that provides a graphical output for displaying the system's global position and orientation, in real time, with respect to said globally consistent map of said passageway environment.

66. A traffic management method for one or more vehicles located in a passageway environment, the vehicles each being equipped with one or more odometric sensors, one or more range-sensing devices, and a microprocessor including memory storage, said one or more odometric sensors and one or more range-sensing devices being connected to said microprocessor, a central microprocessor being connected to said one or more vehicles by way of a wireless data communications system, and said method comprising the steps of:

a) generating strategic route plans for said one or more vehicles;

b) estimating global positions and orientations of said one or more vehicles in said passageway environment, wherein said step of estimating the global position and orientation of a vehicle in a passageway environment includes the steps of i) moving the vehicle throughout said passageway environment while simultaneously logging raw data from sensors including scans from said one or more range-sensing devices and said one or more odometric sensors, determining the acquisition times of all raw data, and storing said raw data and acquisition times in said microprocessor memory storage ii) pre-processing said logged data to obtain estimates of the vehicle's positions and orientations during the logging process iii) storing said logged and pre-processed data to a log file in said microprocessor memory storage iv) creating a globally consistent map of said passageway environment from said logged and pre-processed data and storing said globally consistent map in said microprocessor memory storage, and v) repeatedly determining the global position and orientation of the vehicle, in real time, as it is propelled through said passageway environment, using said one or more range-sensing devices, said one or more odometric sensors, said microprocessor, and said globally consistent map of said passageway environment stored in said microprocessor memory storage; and c) monitoring the global position and orientation of said one or more vehicles in said passageway environment as said one or more vehicles progress along said strategic route plans.

67. The method according to claim 66 wherein said vehicle is moved throughout said passageway environment by an operator manually driving the vehicle through said passageway environment, or said vehicle being configured for tele-operation and remotely driving through said passageway environment.

68. The method according to claim 66 wherein data is logged from sensors that acquire information relating to radio frequency identification (RFID) infrastructure, if present in said passageway environment.

69. The method according to claim 68 wherein said globally consistent map of said passageway environment is created to include estimates of the locations of RFID infrastructure, if present in said passageway environment, with respect to said globally consistent map.

70. The method according to claim 66 wherein data is logged from sensors that acquire information relating to communications system infrastructure, if present in said passageway environment.

71. The method according to claim 70 wherein said globally consistent map of said passageway environment is created to include estimates of the locations of communications system infrastructure, if present in said passageway environment, with respect to said globally consistent map.

72. The method according to claim 66 wherein logged data is pre-processed to obtain estimates of the vehicle's positions and orientations during logging by applying dead-reckoning based on raw data from said one or more odometric sensors and by improving said dead-reckoned estimates by comparing each range-sensing device scan to one or more scans that precede it in time.

73. The method according to claim 66 wherein said globally consistent map is constructed by generating a sequence of local maps of the passageway environment from said logged sensor data, said data acquisition times, and said pre-processed data stored in said microprocessor memory storage, combining said local maps of the passageway environment into one or more larger maps that are globally consistent, and storing the local maps and said globally consistent maps of said passageway environment in said microprocessor memory storage.

74. The method according to claim 73 wherein said globally consistent map of said passageway environment is constructed by combining multiple globally consistent maps into a larger globally consistent map.

75. The method according to claim 73 wherein said local maps are combined into one or more globally consistent maps by using input provided by a human operator by way of a user interface.

76. The method according to claim 73 wherein said local maps and said globally consistent map are metric maps, and wherein said local metric maps are combined into one or more globally consistent maps by determining which local metric maps are associated and which are not, matching sub-regions of said local metric maps to one another, aligning said local metric maps with respect to one another, subsequently optimizing the quality of said matching and alignment of all the local metric maps by minimizing a desirable error metric, and repeating said matching and alignment steps until an acceptably small error has been achieved or a specified maximum number of iterations has been reached.

77. The method according to claim 73 wherein said local maps and said globally consistent map are metric maps, and wherein said local metric maps of said passageway environment are constructed using logged data from both said one or more odometric sensors and one or more range-sensing devices and wherein said local metric maps include grids of cells, wherein each cell takes on a cell value of either 'occupied' or 'not occupied' such that a cell is assigned to be 'occupied' if it is estimated that the region of said passageway represented by the cell contains an obstacle, and a cell is assigned to be 'not occupied' if the region of said passageway represented by the cell contains free space that is possibly traversable by a self-propelled vehicle.

78. The method according to claims 77 wherein spacing and boundaries of said local metric maps are constructed using by knowledge of the sensing range of said one or more range-sensing devices, the maximum size of corridors within said passageway environment, and a drift error associated with dead-reckoning, and such that there is sufficient overlap in the regions expressed by contiguous local metric maps so as to enable said step of combining local metric maps into a globally consistent map of said passageway environment.

79. The method according to claim 77 wherein the cell values for said local metric maps are determined by using a ray-tracing algorithm to mark those cells from the vehicle's position out to the measured range-sensing device reading as 'not occupied' and cells a short distance beyond as 'occupied', then taking a tally of the cell values over all the logged data from said one or more range-sensing devices used for each local map and computing a final cell value by using the most common value for that cell.

80. The method according to claim 66 wherein said step of repeatedly determining the global position and orientation of the vehicle, in real time, as it is moved through said passageway environment includes the step of estimating the initial global position and orientation of the vehicle with respect to said globally consistent map before movement of the vehicle by using said one or more range-sensing devices.

81. The method according to claim 80 wherein said globally consistent map is a metric map, and wherein said step of estimating the initial global position and orientation of the vehicle with respect to said globally consistent metric map before movement includes the steps of selecting a finite set of feasible hypotheses representing possible initial global positions and orientations for the vehicle, locally optimizing each of said hypotheses by a suitable optimization algorithm, computing weights for each of said hypotheses by comparing data acquired from said one or more range-sensing devices to the expected value for each hypothesis given said globally consistent map, and determining the most likely initial global position and orientation of the vehicle from said computed weights associated with said hypotheses.

82. The method according to claim 81 wherein an error signal is reported if the weight associated with said most likely initial global position and orientation vehicle is below some specified threshold and including the step of repeating said method for estimating the initial global position and orientation of the vehicle until said weight is above said threshold value or a specified maximum number of repetitions has been reached.

83. The method according to claim 81 wherein said step of estimating the initial global position and orientation of the vehicle includes passing said estimate to a user interface connected to said microprocessor that requests confirmation from a user that said estimate is a reasonable estimate.

84. The method according to claim 81 wherein said set of feasible hypotheses are selected by incorporating knowledge about the location of RFID infrastructure in said passageway environment.

85. The method according to claim 81 wherein said set of feasible hypotheses are selected by incorporating knowledge about the location of communications system infrastructure in said passageway environment.

86. The method according to claim 81 wherein said step of repeatedly determining the global position and orientation of the vehicle includes determining a level of confidence associated with said global position and orientation estimate.

87. The method according to claim 80 wherein said globally consistent map is a globally consistent metric map, and wherein said step of repeatedly determining the global position and orientation of the vehicle includes estimating the vehicle's position and orientation by dead-reckoning and the step of using data from said one or more range-sensing devices for correcting said dead-reckoned vehicle position and orientation using said globally consistent metric map.

88. The method according to claim 87 wherein said step of correcting said dead-reckoned vehicle position and orientation using said globally consistent metric map includes minimizing a suitable error between data acquired from said one or more range-sensing devices and the expected range-sensing device data for an appropriately selected set of possible positions and orientations of the vehicle given said globally consistent metric map.

89. The method according to claim 66 wherein an interface is connected to said microprocessor that provides a graphical user interface to allow for user input and for human monitoring of the global positions and orientations of all vehicles with respect to a globally consistent map of said passageway environment.

90. The method according to claim 66 wherein said globally consistent map is a metric map, and wherein said route planning step includes the steps of generating a directed graph representation of said passageway environment, specifying a sequence of goal states for said one or more vehicles to visit based on said directed graph representation, and generating a route plan for each vehicle to sequentially visit said respective goal states.

91. The method according to claim 90 wherein said route plans for said one or more vehicles together minimize the total travel time for the group of said one or more vehicles, and wherein said route planning step includes ensuring that the route plans for said one or more vehicles do not result in collisions between said vehicles if the number of vehicles is greater than one.

92. The method according to claim 91 wherein said route planning step of minimizing the total travel time for the group of said one or more vehicles is based on a search of said directed graph representation of said passageway environment.

93. The method according to claim 90 wherein said step of generating said directed graph representation of said passageway environment includes generating a sequence of waypoints that contains information relating to i) a local path in said passageway environment, and ii) a local metric map defined relative to said local path.

94. The method according to claim 93 wherein said step of generating a directed graph representation of said passageway environment includes generating a sequence of constraints that contain information about how said local paths should be stitched together and information about how to combine said local metric maps into one or more globally consistent metric maps.

95. The method according to claim 93 wherein said local paths are constructed from sequences of local path points in said passageway environment, and wherein said local path points include information to help steer a vehicle along the path and information to help specify an appropriate speed for a vehicle travelling along the path.

96. The method according to claim 90 wherein said step of generating said directed graph representation of said passageway environment includes generating a sequence of closely spaced waypoints so that paths traversable by the vehicles can be constructed by forming sequences of said waypoints.

97. The method according to claim 90 wherein said sequence of goal states for said one or more vehicles to visit includes desired start and end positions and orientations for each vehicle and, if appropriate, additional intermediate positions and orientations representing pause states.

98. The method according to claim 90 wherein said goal states are either supplied by a user or by external supervisory control software.

99. The method according to claim 66 wherein said vehicle monitoring step includes the steps of comparing, in real time, the estimated global position and orientation of each vehicle in said passageway environment to its desired position and orientation as specified by said route planning step, and providing notification if one or more vehicles deviate too far from their respective desired global positions and orientations as specified by said route planning step.

100. The method according to claim 66 wherein said vehicle monitoring step includes the steps of comparing, in real time, the estimated speed of each vehicle to its desired speed as specified by said route planning step and providing notification if one or more vehicles deviate too far from their respective desired speeds as specified by said route planning step.

101. The method according to claim 66 wherein said vehicle monitoring step includes the steps of comparing the estimated global position and orientation of each vehicle in said passageway environment with the global positions and orientations of every other vehicle in said passageway environment, determining if one or more vehicles represent a proximity danger to other vehicles, and providing immediate notification to all affected vehicles by way of said wireless data communications system if any vehicle represents a potential proximity danger to any other vehicle.

102. The method according to claim 66 wherein said central microprocessor that executes said route planning and vehicle monitoring steps includes a graphical user interface to allow for user input and for human monitoring of the global positions and orientations of all vehicles with respect to a globally consistent map of said passageway environment.

103. The method according to claim 66 wherein step c) includes monitoring the vehicle's speed to check whether it is exceeding the speed recommended by the route plan, or whether it is travelling too slowly.

104. A method for estimating the global position and orientation of a vehicle in a passageway environment, the vehicle being equipped with one or more odometric sensors, one or more range-sensing devices, and a microprocessor including memory storage, said one or more odometric sensors and one or more range-sensing devices being connected to said microprocessor, and said method including the steps of
a) estimating the global position and orientation of the vehicle in a passageway environment by the steps of
i) moving the vehicle throughout said passageway environment while simultaneously logging raw data from sensors including scans from said one or more range-sensing devices and said one or more odometric sensors, determining the acquisition times of all raw data, and storing said raw data and acquisition times in said microprocessor memory storage
ii) pre-processing said logged data to obtain estimates of the vehicle's positions and orientations during the logging process
iii) storing said logged and pre-processed data to a log file in said microprocessor memory storage
iv) creating a globally consistent map of said passageway environment from said logged and pre-processed data and storing said globally consistent map in said microprocessor memory storage, and
v) repeatedly determining the global position and orientation of the vehicle, in real time, as it is propelled through said passageway environment, using said one or more range-sensing devices, said one or more odometric sensors, said microprocessor, and said globally consistent map of said passageway environment stored in said microprocessor memory storage.

105. The method according to claim 104 wherein said vehicle is moved throughout said passageway by having an operator manually drive the vehicle through said passageway environment, or said vehicle is configured for tele-operation and remotely driven through said passageway environment.

106. The method according to claim 104 wherein data is logged from sensors that acquire information relating to radio frequency identification (RFID) infrastructure, if present in said passageway environment.

107. The method according to claim 106 wherein said globally consistent map of said passageway environment is created to include estimates of the locations of RFID infrastructure, if present in said passageway environment, with respect to said globally consistent map.

108. The method according to claim 104 wherein data is logged from sensors that acquire information relating to communications system infrastructure, if present in said passageway environment.

109. The method according to claim 108 wherein said globally consistent map of said passageway environment is created to include estimates of the locations of communications system infrastructure, if present in said passageway environment, with respect to said globally consistent map.

110. The method according to claim 104 wherein logged data is pre-processed to obtain estimates of the vehicle's positions and orientations during logging by applying dead-reckoning based on raw data from said one or more odometric sensors and by improving said dead-reckoned estimates by comparing each range-sensing device scan to one or more scans that precede it in time.

111. The method according to claim 104 wherein said globally consistent map is constructed by generating a sequence of local maps of the passageway environment from said logged sensor data, said data acquisition times, and said pre-processed data stored in said microprocessor memory storage, combining said local maps of the passageway environment into one or more larger maps that are globally consistent, and storing the local maps and said globally consistent maps of said passageway environment in said microprocessor memory storage.

112. The method according to claim 111 wherein said globally consistent map of said passageway environment is constructed by combining multiple globally consistent maps into a larger globally consistent map.

113. The method according to claim 111 wherein said local maps are combined into one or more globally consistent maps by using input provided by a human operator by way of a user interface.

114. The method according to claim 111 wherein said local maps and said globally consistent map are metric maps, and wherein said local metric maps are combined into one or more globally consistent maps by determining which local metric maps are associated and which are not, matching sub-regions of said local metric maps to one another, aligning said local metric maps with respect to one another, subsequently optimizing the quality of said matching and alignment of all the local metric maps by minimizing a desirable error metric, and repeating said matching and alignment steps until an acceptably small error has been achieved or a specified maximum number of iterations has been reached.

115. The method according to claim 111 wherein said local maps and said globally consistent map are metric maps, and wherein said local metric maps of said passageway environment are constructed using logged data from both said one or more odometric sensors and one or more range-sensing devices and wherein said local metric maps include grids of cells, wherein each cell takes on a cell value of either 'occupied' or 'not occupied' such that a cell is assigned to be 'occupied' if it is estimated that the region of said passageway represented by the cell contains an obstacle, and a cell is assigned to be 'not occupied' if the region of said passageway represented by the cell contains free space that is possibly traversable by a self-propelled vehicle.

116. The method according to claim 115 wherein spacing and boundaries of said local metric maps are constructed using by knowledge of the sensing range of said one or more range-sensing devices, the maximum size of corridors within said passageway environment, and a drift error associated with dead-reckoning, and such that there is sufficient overlap in the regions expressed by contiguous local metric maps so as to enable said step of combining local metric maps into a globally consistent map of said passageway environment.

117. The method according to claim 115 wherein the cell values for said local metric maps are determined by using a ray-tracing algorithm to mark those cells from the vehicle's position out to the measured range-sensing device reading as 'not occupied' and cells a short distance beyond as 'occupied', then taking a tally of the cell values over all the logged data from said one or more range-sensing devices used for each local map and computing a final cell value by using the most common value for that cell.

118. The method according to claim 104 wherein said step of repeatedly determining the global position and orientation of the vehicle, in real time, as it is moved through said passageway environment includes the step of estimating the initial global position and orientation of the vehicle with respect to said globally consistent map before movement of the vehicle by using said one or more range-sensing devices.

119. The method according to claim 118 wherein said globally consistent map is a globally consistent metric map, and wherein said step of estimating the initial global position and orientation of the vehicle with respect to said globally consistent metric map before movement includes the steps of selecting a finite set of feasible hypotheses representing possible initial global positions and orientations for the vehicle, locally optimizing each of said hypotheses by a suitable optimization algorithm, computing weights for each of said hypotheses by comparing data acquired from said one or more range-sensing devices to the expected value for each hypothesis given said globally consistent map, and determining the most likely initial global position and orientation of the vehicle from said computed weights associated with said hypotheses.

120. The method according to claim 119 wherein an error signal is reported if the weight associated with said most likely initial global position and orientation vehicle is below some specified threshold and including the step of repeating said method for estimating the initial global position and orientation of the vehicle until said weight is above said threshold value or a specified maximum number of repetitions has been reached.

121. The method according to claim 119 wherein said step of estimating the initial global position and orientation of the vehicle includes passing said estimate to a user interface connected to said microprocessor that requests confirmation from a user that said estimate is a reasonable estimate.

122. The method according to claim 119 wherein said set of feasible hypotheses are selected by incorporating knowledge about the location of RFID infrastructure in said passageway environment.

123. The method according to claim 119 wherein said set of feasible hypotheses are selected by incorporating knowledge about the location of communications system infrastructure in said passageway environment.

124. The method according to claim 119 wherein said step of repeatedly determining the global position and orientation of the vehicle includes determining a level of confidence associated with said global position and orientation estimate.

125. The method according to claim 118 wherein said globally consistent map is a globally consistent metric map, and wherein said step of repeatedly determining the global position and orientation of the vehicle includes estimating the vehicle's position and orientation by dead-reckoning and the step of using data from said one or more range-sensing devices for correcting said dead-reckoned vehicle position and orientation using said globally consistent metric map.

126. The method according to claim 25 wherein said step of correcting said dead-reckoned vehicle position and orientation using said globally consistent metric map includes minimizing a suitable error between data acquired from said one or more range-sensing devices and the expected range-sensing device data for an appropriately selected set of possible positions and orientations of the vehicle given said globally consistent metric map.

127. The method according to claim 104 wherein an interface is connected to said microprocessor that provides a graphical output for displaying the system's global position and orientation, in real time, with respect to said globally consistent map of said passageway environment.

* * * * *

UNITED STATES PATENT AND TRADEMARK OFFICE
CERTIFICATE OF CORRECTION

| | | |
|---|---|---|
| PATENT NO. | : 7,756,615 B2 | Page 1 of 1 |
| APPLICATION NO. | : 11/493027 | |
| DATED | : July 13, 2010 | |
| INVENTOR(S) | : Barfoot et al. | |

It is certified that error appears in the above-identified patent and that said Letters Patent is hereby corrected as shown below:

Please amend claim 126 as indicated below:

126. The method according to claim [[25]] 125 wherein said step of correcting said dead-reckoned vehicle position and orientation using said globally consistent metric map includes minimizing a suitable error between data acquired from said one or more range-sensing devices and the expected range-sensing device data for an appropriately selected set of possible positions and orientations of the vehicle given said globally consistent metric map.

Signed and Sealed this
Twenty-sixth Day of April, 2011

David J. Kappos
*Director of the United States Patent and Trademark Office*

UNITED STATES PATENT AND TRADEMARK OFFICE
CERTIFICATE OF CORRECTION

PATENT NO. : 7,756,615 B2
APPLICATION NO. : 11/493027
DATED : July 13, 2010
INVENTOR(S) : Barfoot et al.

Page 1 of 1

It is certified that error appears in the above-identified patent and that said Letters Patent is hereby corrected as shown below:

Column 37, lines 1-8, claim 126 should read as follows:

126. The method according to claim 125 wherein said step of correcting said dead-reckoned vehicle position and orientation using said globally consistent metric map includes minimizing a suitable error between data acquired from said one or more range-sensing devices and the expected range-sensing device data for an appropriately selected set of possible positions and orientations of the vehicle given said globally consistent metric map.

This certificate supersedes the Certificate of Correction issued April 26, 2011.

Signed and Sealed this
Twenty-fourth Day of May, 2011

David J. Kappos
*Director of the United States Patent and Trademark Office*